(12) United States Patent
Akieda et al.

(10) Patent No.: US 7,750,889 B2
(45) Date of Patent: Jul. 6, 2010

(54) INPUT DEVICE

(75) Inventors: Shinichiro Akieda, Shinagawa (JP);
Junichi Akama, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 1051 days.

(21) Appl. No.: 11/339,629

(22) Filed: Jan. 26, 2006

(65) Prior Publication Data

US 2006/0164388 A1 Jul. 27, 2006

(30) Foreign Application Priority Data

Jan. 26, 2005 (JP) .............................. 2005-018994

(51) Int. Cl.
*G09G 5/00* (2006.01)
(52) U.S. Cl. ........................ 345/156; 345/157; 345/161
(58) Field of Classification Search ................. 345/156, 345/157, 161, 163, 166; 335/222; 235/462.01
See application file for complete search history.

(56) References Cited

U.S. PATENT DOCUMENTS

| | | | | |
|---|---|---|---|---|
| 4,439,672 A | * | 3/1984 | Salaman ................ | 235/462.01 |
| 5,327,162 A | * | 7/1994 | Soma .......................... | 345/161 |
| 6,326,948 B1 | * | 12/2001 | Kobachi et al. ............. | 345/157 |
| 6,552,713 B1 | * | 4/2003 | Van Brocklin et al. ...... | 345/157 |
| 6,816,049 B2 | * | 11/2004 | Watanabe et al. ........... | 335/222 |
| 2002/0180701 A1 | * | 12/2002 | Hayama et al. ............. | 345/163 |
| 2004/0145568 A1 | * | 7/2004 | Ahn ............................ | 345/166 |

FOREIGN PATENT DOCUMENTS

| | | |
|---|---|---|
| JP | 58-80517 | 5/1983 |
| JP | 63-240085 | 10/1988 |
| JP | 1-125729 | 5/1989 |

\* cited by examiner

*Primary Examiner*—Amare Mengistu
*Assistant Examiner*—Premal Patel
(74) *Attorney, Agent, or Firm*—Staas & Halsey LLP

(57) ABSTRACT

An input device, which detects a position of a movable object moving on a given plane and inputs an instruction, includes a first detection portion and a second detection portion. The first detection portion detects the position of the movable object in a first direction. The second detection portion detects the position of the movable object in a second direction crossed at right angle to the first direction. The first detection portion and the second detection portion detect movement amounts of the movable object in the first direction and in the second direction, based on a change of either a light quantity or a magnetic flux.

18 Claims, 20 Drawing Sheets

INPUT DEVICE

BACKGROUND OF THE INVENTION

1. Field of the Invention

This invention generally relates to an input device inputting an instruction into a personal computer, and in particular, relates to an input device using a detection signal based on a position of a movable object moving along a given plane.

2. Description of the Related Art

Conventionally, an input device inputting an instruction by using position information of a movable object is known. This input device is, for example, connected to a computer and is used for inputting an instruction of an operator. In addition, input devices, which detect a position of a movable object by using a change of light or magnetic flux, are proposed conventionally. As to an art in which an amount of movement of a movable object is detected by using a change of light, Japanese Patent Application Publication No. 58-80517 (hereinafter referred to as Document 1) discloses, for example, a potentiometer having an optical emitter and an optical receiver respectively on both sides of a slit-having revolution body thereof and detecting a position of a movable object. Similarly, Japanese Patent Application Publication No. 1-125729 (hereinafter referred to as Document 2) discloses, for example, an optical position detecting device, which has an optical emitter and an optical receiver arranged at a fixed position and detects a position of a movable object having a slit. As to an art in which an amount of movement of a movable object is detected by using a change of magnetic flux, Japanese Patent Application Publication No. 63-240085 (hereinafter referred to as Document 3) discloses, for example, a magnetic potentiometer, which has a magnetic member and a magnetic flux detector arranged at a fixed position and detects a position of a revolution body having a slit.

The devices disclosed in Document 1 through Document 3 detect the movable object having a slit based on a change of light or magnetic flux. The devices only detect the amount of movement of the revolution body. On the other hand, an input device inputting an instruction into a computer, a car, a game machine or the like has a component changing an electrical resistance such as a volume switch. In the input device, a friction is generated when an operator changes the electrical resistance. That is, there is generated a load when the operator operates the device. It is thus different to operate the device minutely. These arts using a change of light or magnetic flux are used for position detection of a movable object. There is not provided an input device using the arts using a change of light or magnetic flux.

SUMMARY OF THE INVENTION

The present invention has an object to provide a loadless input device detecting a position of a movable object by using a change of light or magnetic flux and inputting an instruction by using the position information.

According to an aspect of the present invention, preferably, there is provided an input device which detects a position of a movable object moving on a given plane and inputs an instruction, including a first detection portion, a second detection portion. The first detection portion detects the position of the movable object in a first direction. The second detection portion detects the position of the movable object in a second direction crossed at right angle to the first direction. The first detection portion and the second detection portion detect movement amounts of the movable object in the first direction and in the second direction, based on a change of either a light quantity or a magnetic flux.

In accordance with the present invention, the first detection portion and the second detection portion are arranged respectively on two axes crossed at right angle to each other and detect the position of the movable object based on a change of light quantity or magnetic flux. And the input device input an instruction by using the position information. It is thus possible to reduce a load of the input device in accordance with the present invention.

BRIEF DESCRIPTION OF THE DRAWINGS

Preferred embodiments of the present invention will be described in detail with reference to the following drawings, wherein.

DESCRIPTION OF THE PREFERRED EMBODIMENTS

A description will now be given, with reference to the accompanying drawings, of embodiments of an input device in accordance with the present invention. In the input device in accordance with an aspect of the present invention, a first detection portion and a second detection portion are arranged respectively on two axes virtually crossed at a right angle to each other (These axes virtually serves as an X-axis and a Y-axis). The first detection portion and the second detection portion detect a position of a movable object based on a change of light quantity or magnetic flux.

First Embodiment

Figure 1A:
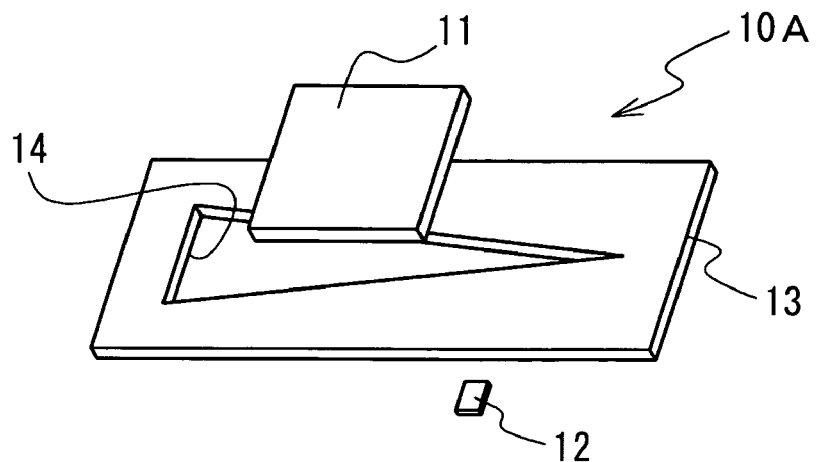
FIG. 1A through FIG. 1D schematically illustrate a configuration of a detection portion included in an input device in accordance with a first embodiment.
Figure 1B:
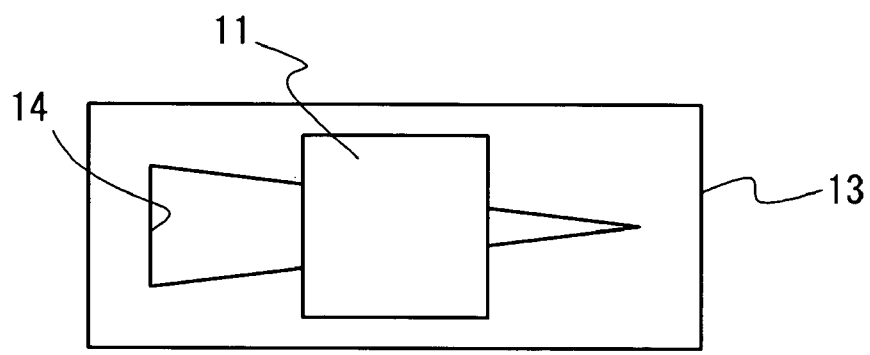
Figure 1C:
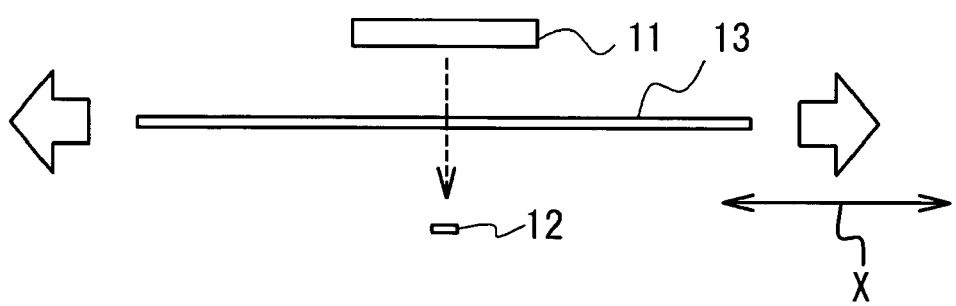
Figure 1D:
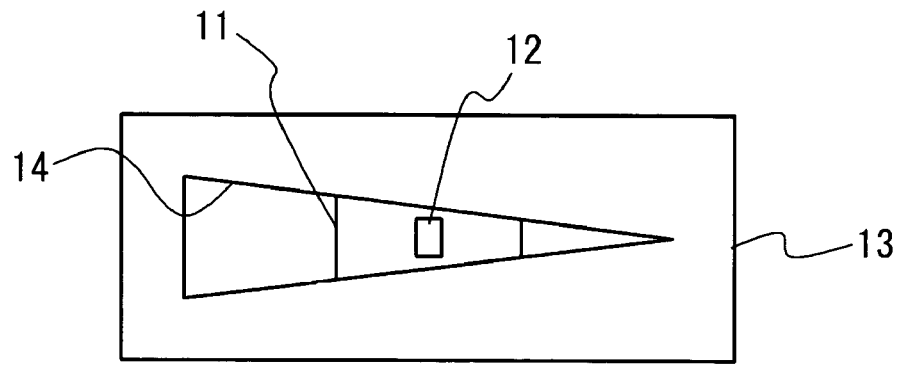

An input device 1 in accordance with a first embodiment detects the positions of the movable object on the X-axis and the Y-axis based on the change of light quantity, and uses the position information for inputting an instruction to a computer. At first, a description will be given of a basic configuration of a detection portion provided in the input device 1. FIG. 1A through FIG. 1D illustrate a configuration of the detection portion schematically. This configuration is common between two detection portions in the input device 1. FIG. 1A illustrates a perspective view of a detection portion 10A, FIG. 1B illustrates a top view of the detection portion 10A, FIG. 1C illustrates a side view of the detection portion 10A and FIG. 1D illustrates a bottom view of the detection portion 10A.

The detection portion 10A has an optical emitter 11 emitting a light and has an optical receiver 12 outputting a signal based on a change of light (a change of light quantity) emitted from the optical emitter 11. A light emitting element such as a LED (Light Emitting Diode) may be used as the optical emitter 11. A light detecting element such as a PD (Photo Detector) may be used as the optical receiver 12.

The optical emitter 11 and the optical receiver 12 are arranged at a given interval and faces each other. The optical receiver 12 receives a light from the optical emitter 11. The optical receiver 12 outputs a signal based on a quantity of the light. The optical emitter 11 emits a constant light. Accordingly, the optical receiver outputs a constant detection signal if there is no obstacle between the optical emitter 11 and the optical receiver 12.

A light quantity regulator 13 is, however, provided between the optical emitter 11 and the optical receiver 12, and serves as a light barrier. The light quantity regulator 13 is a shading thin sheet member formed of a resin or the like. A hole (a slit) 14 is formed at the center of the light quantity regulator 13. The optical receiver 12 detects the light that is emitted from the optical emitter 11 and passes through the hole 14. In addition, the pair of the optical emitter 11 and the optical receiver 12 moves relative to the light quantity regulator 13. In the first embodiment, the optical emitter 11 and the optical receiver 12 are arranged at a fixed position and the light quantity regulator 13 is movable, as shown in FIG. 1C. A description will be given later of the driving mechanism.

The hole 14 is formed so that the light passing through the hole 14 changes continuously with the movement of the light quantity regulator 13, that is, the light quantity changes continuously. In the embodiment as shown in FIG. 1A through FIG. 1D, the hole 14 is formed so that the light quantity increases when the light quantity regulator 13 moves to right side and decreases when the light quantity regulator 13 moves to opposite side. Although the hole 14 has a triangle shape in the embodiment, the shape of the hole 14 is not limited. The hole 14 may be formed so that the light quantity changes with the movement of the light quantity regulator 13.

Figure 2:
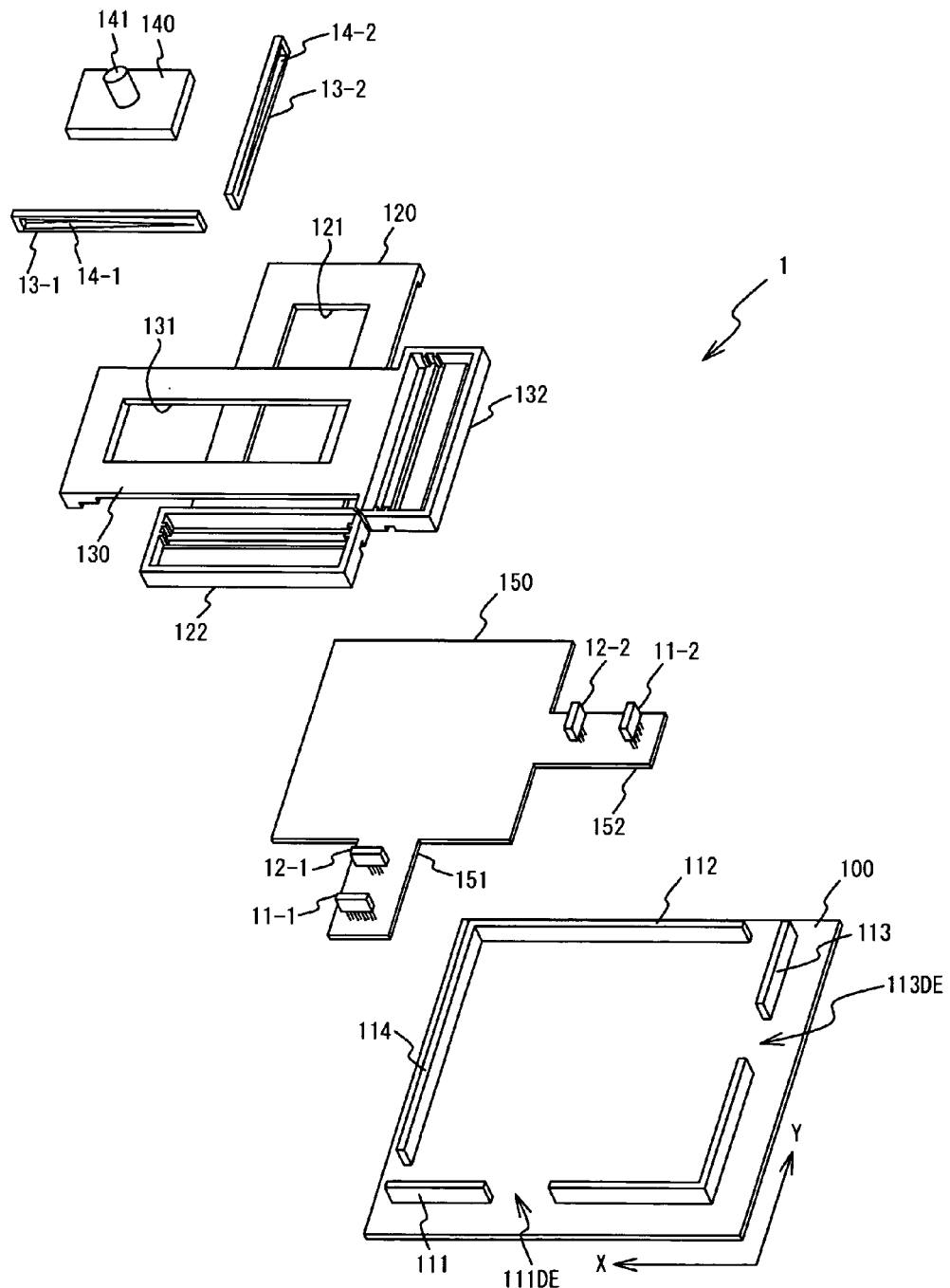
FIG. 2 illustrates an exploded perspective view of a configuration of each part of the input device.
Figure 3:
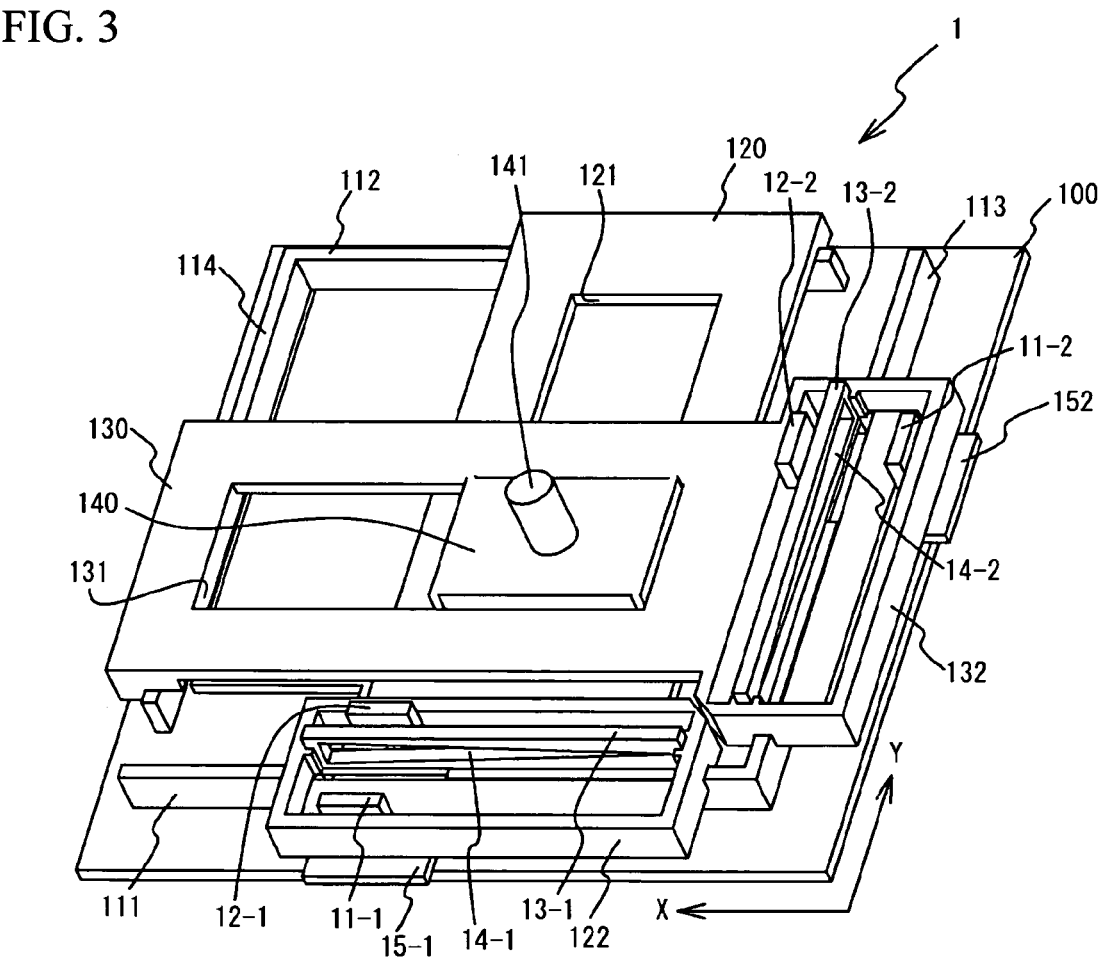
FIG. 3 illustrates a perspective view of an exterior of the input devices shown in FIG. 2.
Figure 4:
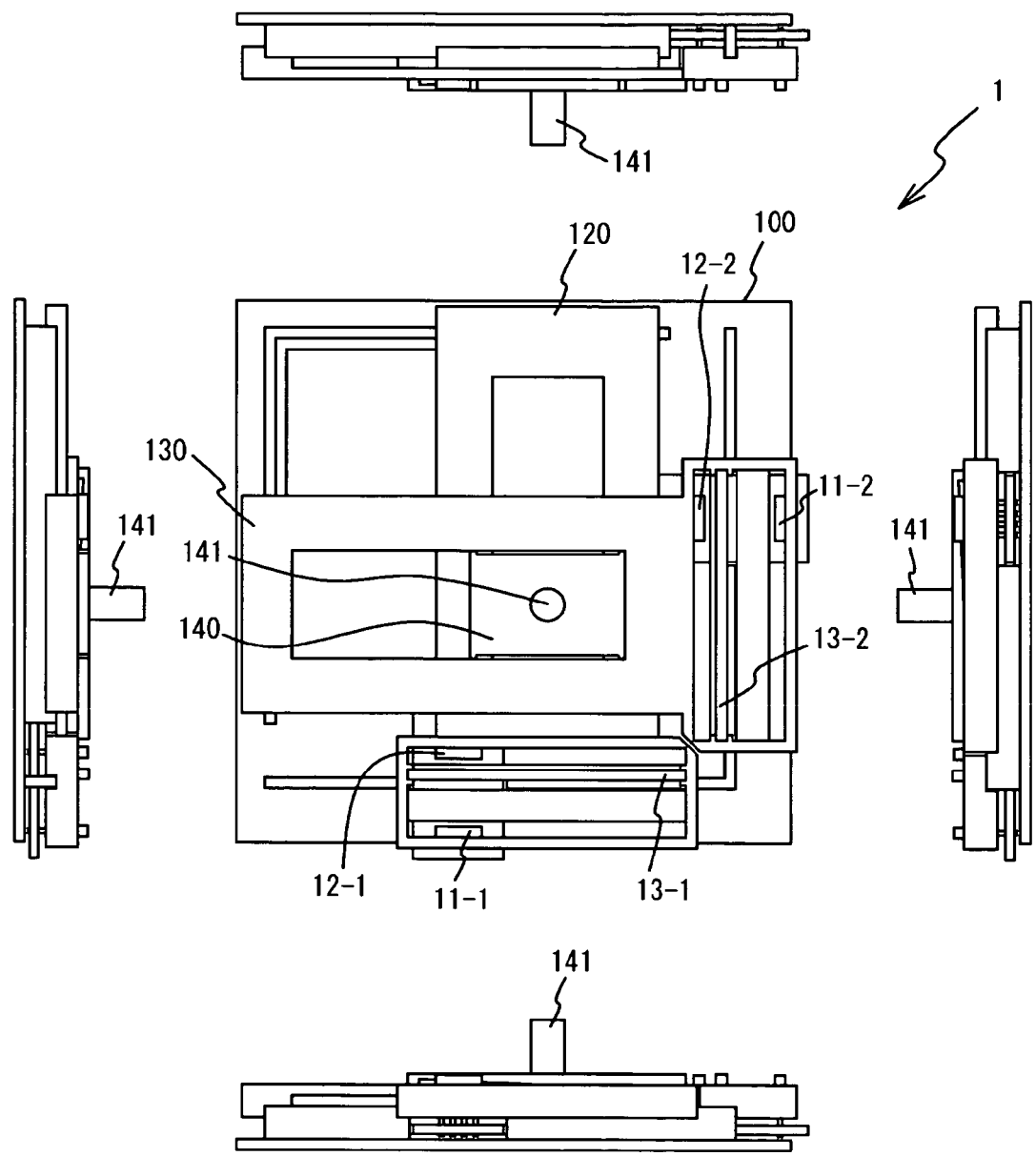
FIG. 4 illustrates a top view of the input device shown in FIG. 2 at the center thereof and illustrates four side views of the input device around the top view.

Next, a description will be given of the input device 1 with reference to FIG. 2 through FIG. 4. Two detection portions 10A shown in FIG. 1A through FIG. 1D are respectively arranged on the X-axis and the Y-axis virtually crossed at right angle to each other. FIG. 2 illustrates an exploded perspective view of a configuration of each part of the input device 1, FIG. 3 illustrates a perspective view of an exterior of the input device 1, and FIG. 4 illustrates a top view of the input device 1 at the center thereof and illustrates four side views of the input device 1 around the top view. In addition, the input device has two detection portions 10A as the first detection portion and the second detection portion, and additional numerals (-1, -2) are employed for the detection portions 10A.

The input device 1 has a structure in which members are built up on a flat board 100. The input device 1 has a first slider 120 being capable of moving along the X-axis direction and has a second slider 130 being capable of moving along the Y-axis direction. The first slider 120 is guided by a pair of a rail 111 and a rail 112 provided respectively at upper side and lower side of the board 100. The second slider 130 is guided by a pair of a rail 113 and a rail 114 provided respectively at right side and left side of the board 100.

A cutout 111DE and a cutout 113DE are formed respectively in the rail 111 and the rail 113. The input device 1 has a support board 150 that is just engaged in a space surrounded by the rail 111 through the rail 114 and has a first arm 151 and a second arm 152 projecting from each of the cutouts. The first arm 151 has a first optical emitter 11-1 and a first optical receiver 12-1 that are a part of the first detection portion, are arranged at a given interval and are facing to each other. This given interval allows the movement along the X-axis direction of a first light quantity regulator 13-1. Similarly, the second arm 152 has a second optical emitter 11-2 and a second optical receiver 12-2 that are a part of the second detection portion, are arranged at a given interval and are facing to each other. A second light quantity regulator 13-2 is capable of moving along the Y-axis.

The first slider 120 has a substantially rectangular shape, and has an elongate hole 121 formed at the middle thereof and a support frame 122 projecting toward one end thereof. A movable object 140 serving as an operation element is engaged in the elongate hole 121. The movable object 140 has a projection 141 for operation. An operator moves the movable object 140 to a desirable position by operating the projection 141.

The first light quantity regulator 13-1 is arranged in parallel with the X-axis and is engaged in the support frame 122. An elongate hole 14-1 formed in the first light quantity regulator 13-1 has a triangle shape. In detail, the elongate hole 14-1 has a triangle shape whose vertex is at the right end part thereof. A light passing through the elongate 14-1 changes when the first light quantity regulator 13-1 moves in parallel with the X-axis between the first optical emitter 11-1 and the first optical receiver 12-1.

The second slider 130 is arranged virtually crossed with the first slider 120. The second slider 130 is structured as same as the first slider 120. That is, the second slider 130 has an elongate hole 131 formed at the middle thereof and a support frame 132 projecting toward one end thereof. The movable object 140 is engaged in the elongate hole 131. The second light quantity regulator 13-2 is arranged in parallel with the Y-axis and is engaged in the support frame 132. A light passing through the elongate hole 14-2 changes when the second light quantity regulator 13-2 moves in parallel with the Y-axis between the second optical emitter 11-2 and the second optical receiver 12-2.

The movable object 140 is engaged in the elongate hole 121 of the first slider 120 and the elongate hole 131 of the second slider 130. Therefore, when an operator moves the movable object 140, the first slider 120 and the second slider 130 moves, the first light quantity regulator 13-1 moves along the X-axis direction and the second light quantity regulator 13-2 moves along the Y-axis direction. Accordingly, the first optical receiver 12-1 and the second optical receiver 12-2 arranged respectively on each of the axes output a detection signal based on the position of the movable object 140. A given circuit pattern is formed on the support board 150 and the board 100, although the patterns are not illustrated. And it is possible to output the detection signals from the first optical receiver 12-1 and the second optical receiver 12-2 outside. It is thus possible to use the position detection signals of the movable object 140 in the X-Y plane as a signal for inputting an instruction.

Figure 5:
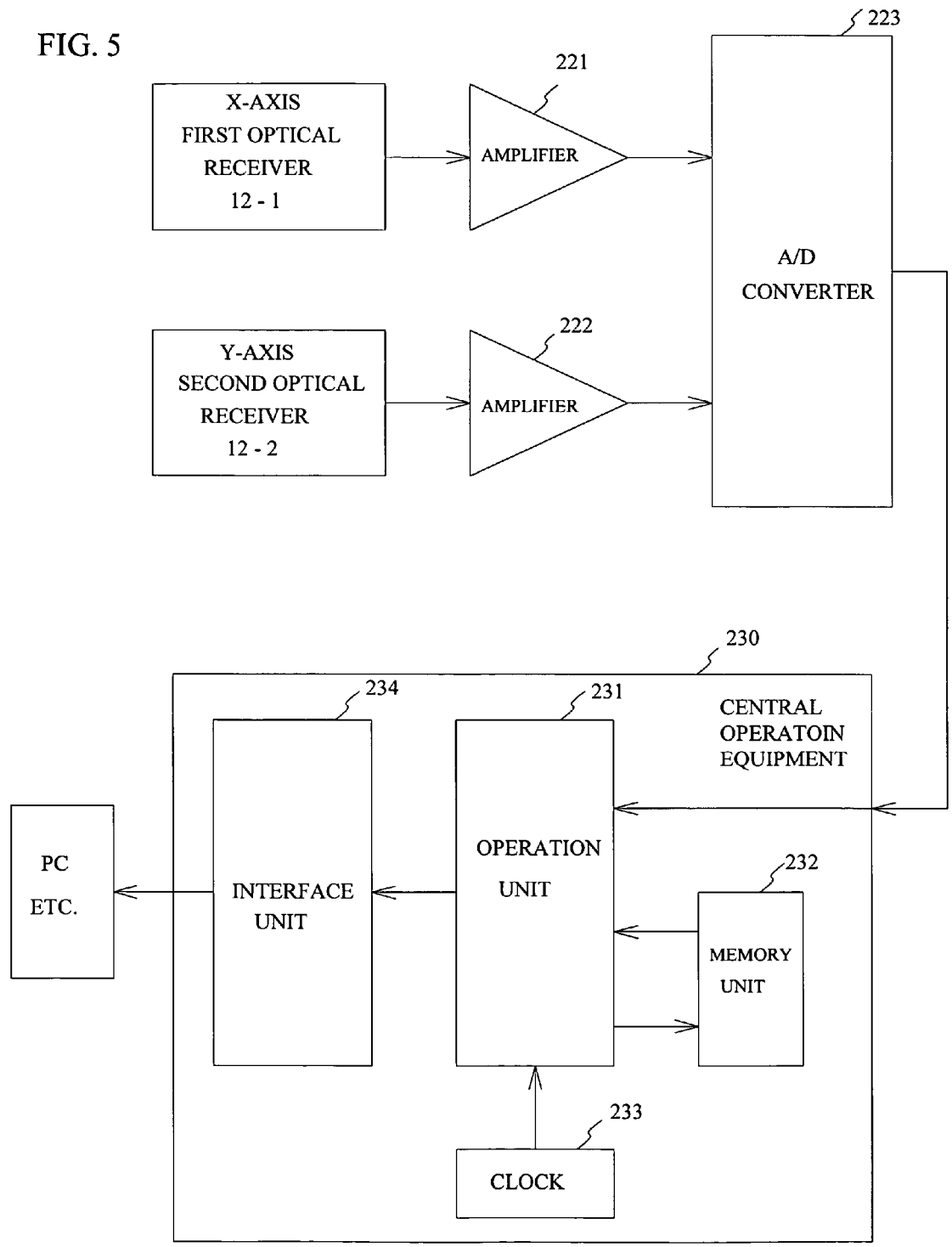
FIG. 5 illustrates a block diagram of electric configuration of the input device shown in FIG. 2.

FIG. 5 illustrates a block diagram of electric configuration of the input device 1. The electric configuration may be arranged on the board 100 or the support board 150. The detection signal from the first optical receiver 12-1 arranged on the X-axis is provided to an amplifier 221, and the detection signal from the second optical receiver 12-2 arranged on the Y-axis is provided to an amplifier 222. Signals amplified by the amplifier 221 and 222 are provided to a central operation equipment 230 through an A/D converter 223. The central operation equipment 230 is, for example, mainly constructed of an operation unit 231 constructed of CPU (Central Processing Unit). The operation unit 231 is connected to a memory unit 232 and a clock 233, and is connected to an outer device such as PC (Personal Computer) through an interface unit 234. And the operation unit 231 input an instruction to the outer device. The memory unit 232 may have a ROM (Read only memory) and a RAM (Random Access memory). For example, the Rom has a program for detecting the position of the movable object 140 based on the signals detected by the first optical receiver 12-1 and the second optical receiver 12-2, and has data associated with the program. The operation unit 231 calculates the position of the movable object 140 by using the program and the data. And an operator can input a position coordinate into the display device of the PC connected to the input device 1 by moving the movable object 140. The input device 1 may be set in a device such as a mouse or a keyboard, and a CPU of the outer device may be used for the central operation equipment 230. In this case, it is possible to simplify the configuration of the input device 1 and to miniaturize the input device 1. In the input device 1, the support board 150 is arranged on the board 100 and the optical emitter 11 and the optical receiver 12 are arranged on the support board 150. However, the optical emitter 11 and the optical receiver 12 may be arranged on the board 100 directly.

Further, a description will be given of an input device that detects the position of the movable object based on the change of the light quantity and uses the light quantity for inputting an instruction. The input device has a same structure shown in FIG. 2 through FIG. 5. Therefore, a description will be given of a detection portion having a different structure.

Second Embodiment

Figure 6A:
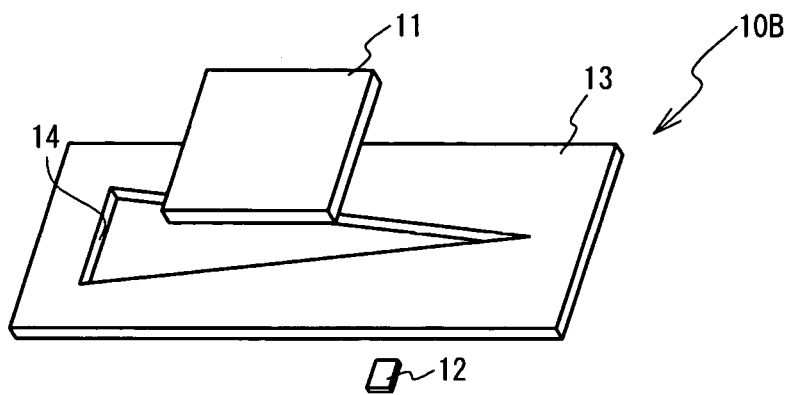
FIG. 6A through FIG. 6D illustrate a detection portion adopted in an input device in accordance with a second embodiment.
Figure 6B:
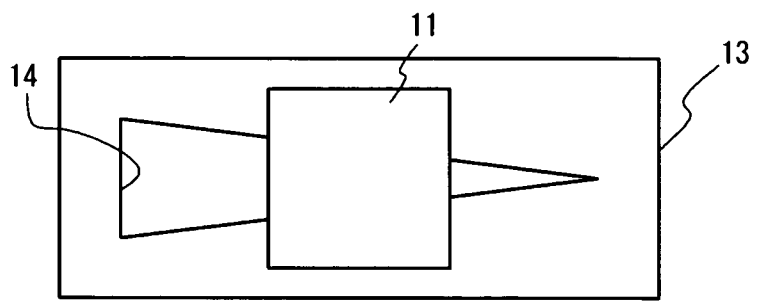
Figure 6C:
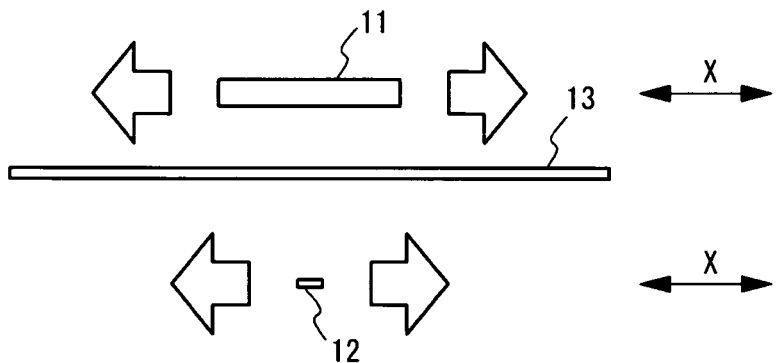
Figure 6D:
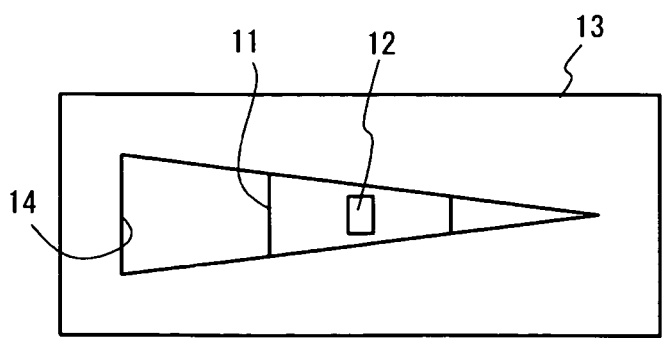

FIG. 6A through FIG. 6D illustrate a detection portion 10B adopted in an input device 1 in accordance with a second embodiment. FIG. 6A illustrates a perspective view of the detection portion 10B, FIG. 6B illustrates a top view of the detection portion 10B, FIG. 6C illustrates a side view of the detection portion 10B and FIG. 6D illustrates a bottom view of the detection portion 10B. In the detection portion 10B, the optical emitter 11 and the optical receiver 12 move together while facing to each other. The light quantity regulator 13 is arranged at a fixed position. The input device that has the detection portion 10B in which the optical emitter 11 and the optical receiver move can input an instruction similarly to the input device in accordance with the first embodiment. In a case where the detection portion 10B is adopted, the first light quantity regulator 13-1 and the second light quantity regulator 13-2 are secured to the support board 150, the first optical emitter 11-1 and the second optical emitter 11-2 and the first optical receiver 12-1 and the second optical receiver 12-2 are respectively secured to the support frame 122 and 132 in the structure shown in FIG. 2. In addition, the first light quantity regulator 13-1 and the second light quantity regulator 13-2 may be secured to the board 100 directly, and the support board 150 may be omitted.

Third Embodiment

Figure 7A:
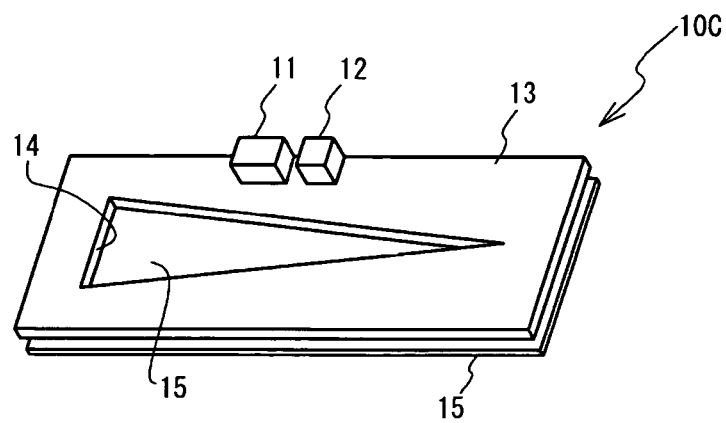
FIG. 7A through FIG. 7D illustrate a detection portion adopted in an input device in accordance with a third embodiment.
Figure 7B:
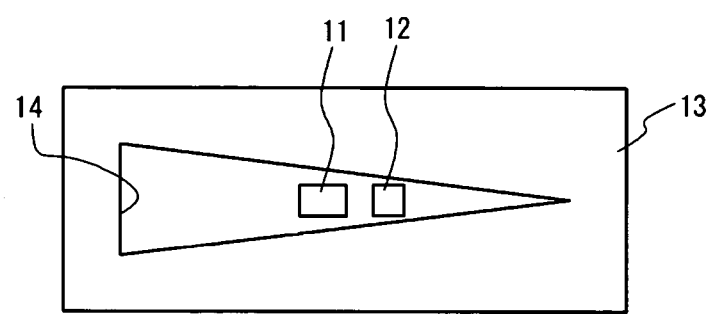
Figure 7C:
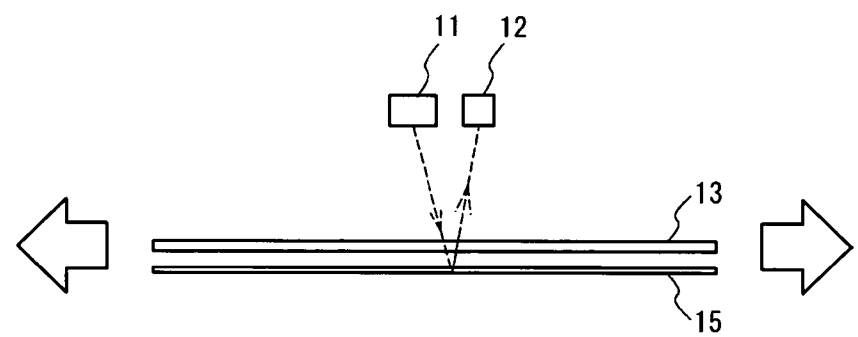
Figure 7D:
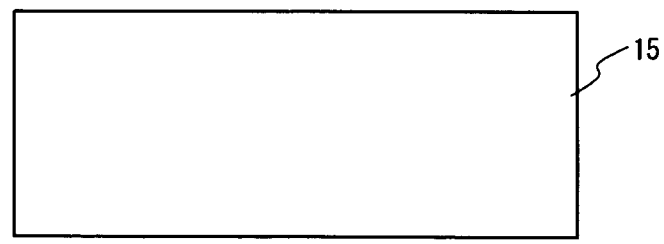

FIG. 7A through FIG. 7D illustrate a detection portion 10C adopted in an input device in accordance with a third embodiment. FIG. 7A illustrates a perspective view of the detection portion 10C, FIG. 7B illustrates a top view of the detection portion 10C, FIG. 7C illustrates a side view of the detection portion 10C and FIG. 7D illustrates a bottom view of the detection portion 10C. In the detection portion 10C, the optical emitter 11 and the optical receiver 12 are arranged at a same side. In particular, the optical emitter 11 and the optical receiver 12 are arranged at a fixed position in a same plane.

An optical reflector 15 is arranged at the back face side (opposite side from the optical emitter 11 and the optical receiver 12) of the light quantity regulator 13. The optical reflector 15 reflects a light from the optical emitter 11 to the optical receiver 12. The light quantity regulator 13 and the optical reflector 15 are secured to the support frame 122 and are movable along the X-axis direction, and another light quantity regulator 13 and another optical reflector 15 are secured to the support frame 132 and are movable along the Y-axis direction, in the structure shown in FIG. 2. The optical emitter 11 and the optical receiver 12 are secured to the support board 150. The input device that has the detection portion 10C in which the optical reflector 15 is provided at the back face side of the light quantity regulator 13 can input an instruction similarly to the input device in accordance with the first embodiment. In addition, it is possible to reduce the thickness of the detection portion 10C because the optical emitter 11 and the optical receiver 12 are arranged at a same side. In particular, it is preferable that the optical emitter 11 and the optical receiver 12 are arranged in a same plane.

Fourth Embodiment

Figure 8A:
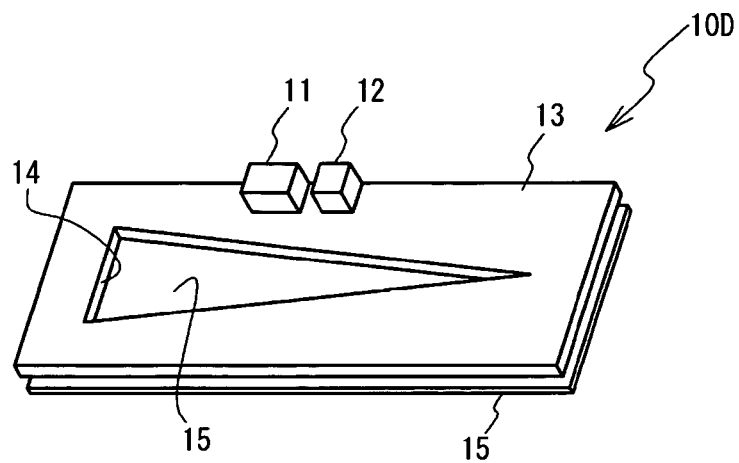
FIG. 8A through FIG. 8D illustrate a detection portion adopted in an input device in accordance with a fourth embodiment.
Figure 8B:
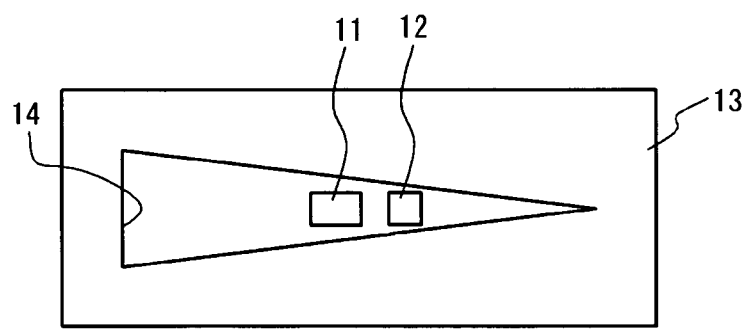
Figure 8C:
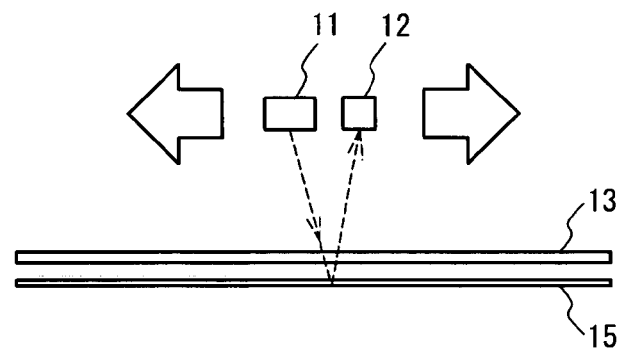
Figure 8D:
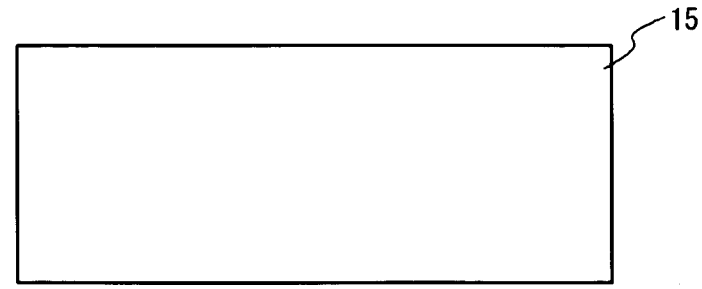

FIG. 8A through FIG. 8D illustrate a detection portion 10D adopted in an input device in accordance with a fourth embodiment. FIG. 8A illustrates a perspective view of the detection portion 10D, FIG. 8B illustrates a top view of the detection portion 10D, FIG. 8C illustrates a side view of the detection portion 10D and FIG. 8D illustrates a bottom view of the detection portion 10D. In the detection portion 10D, the optical emitter 11 and the optical receiver 12 are arranged at a same side, as in the case of the detection portion 10C in accordance with the third embodiment. However, as shown in FIG. 8D, the light quantity regulator 13 and the optical reflector 15 are arranged at a fixed position, and the optical emitter 11 and the optical receiver 12 are movable. As in the case of the second embodiment, the optical emitter 11 and the optical receiver 12 are secured to the support frame 122 and another optical emitter 11 and another optical receiver 12 are secured to the support frame 132, in the structure as shown in FIG. 2. The input device having the detection portion 10D is a thickness-reduced input device being capable of inputting an instruction, similarly to the input device in accordance with the third embodiment.

Fifth Embodiment

Figure 9A:
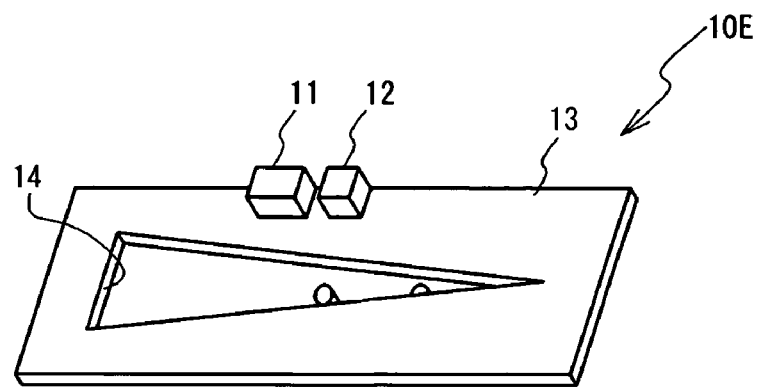
FIG. 9A through FIG. 9D illustrate a detection portion adopted in an input device in accordance with a fifth embodiment.
Figure 9B:
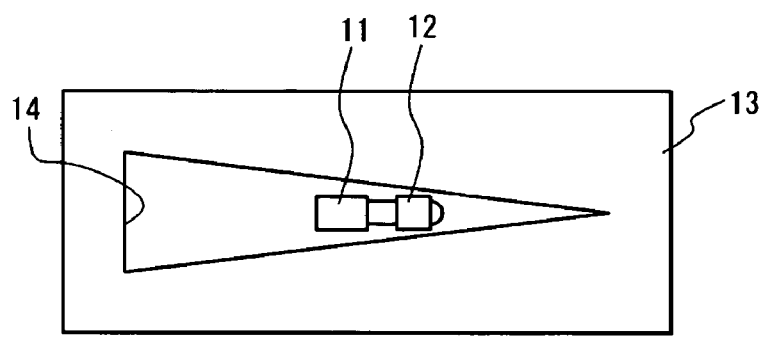
Figure 9C:
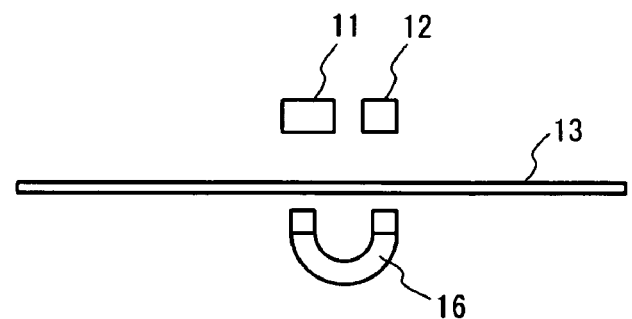
Figure 9D:
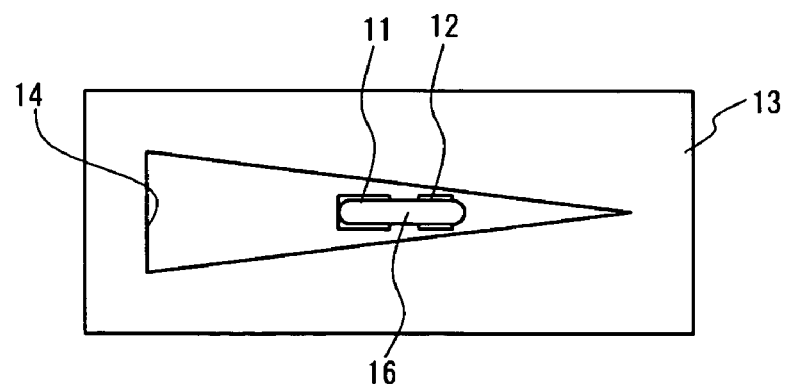

FIG. 9A through FIG. 9D illustrate a detection portion 10E adopted in an input device 1 in accordance with a fifth embodiment. FIG. 9A illustrates a perspective view of the detection portion 10E, FIG. 9B illustrates a top view of the detection portion 10E, FIG. 9C illustrates a side view of the detection portion 10E and FIG. 9D illustrates a bottom view of the detection portion 10E. In the detection portion 10E, the optical emitter 11 and the optical receiver 12 are arranged at a same side. An optical pipe 16 is arranged at the back face side of the light quantity regulator 13. The optical pipe 16 receives a light from the optical emitter 11, introduces the light and emits the light to the optical receiver 12. The input device having the detection portion 10E can input an instruction, as in the case of the input device in accordance with the first embodiment. In the fifth embodiment, the optical emitter 11 and the optical receiver 12 may be arranged at a fixed position, as in the case of the embodiments mentioned above. And the light quantity regulator 13 may be arranged at a fixed position. In a case where the light quantity regulator 13 is movable, the optical pipe 16 may moves with the light quantity regulator 13 or may be arranged at a fixed position.

Sixth Embodiment

Figure 10A:
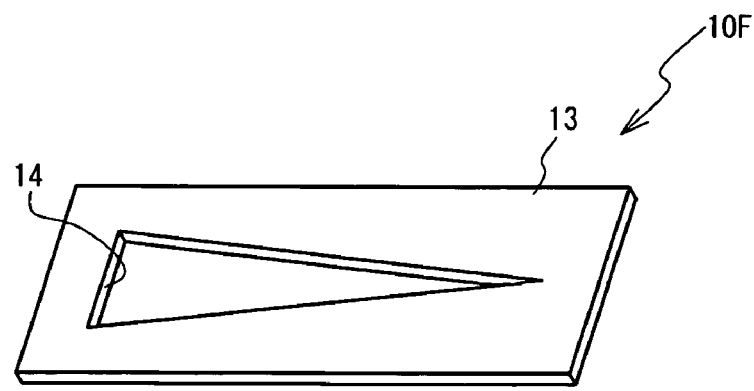
FIG. 10A through FIG. 10D illustrate a detection portion adopted in an input device in accordance with a sixth embodiment.
Figure 10B:
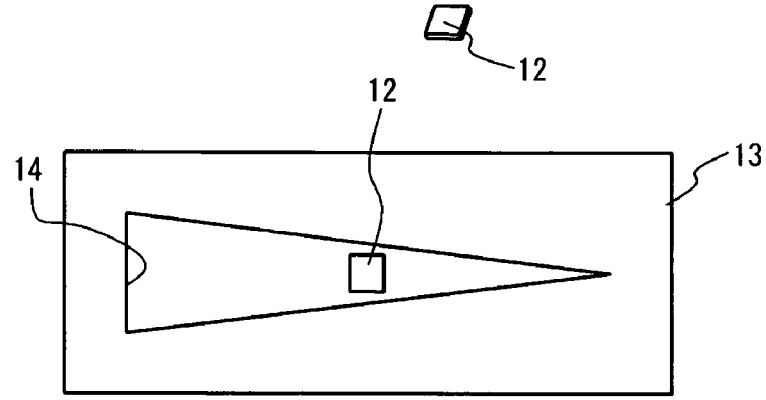
Figure 10C:
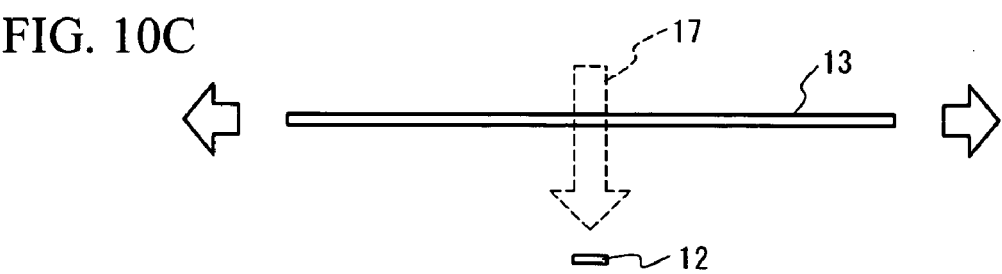
Figure 10D:
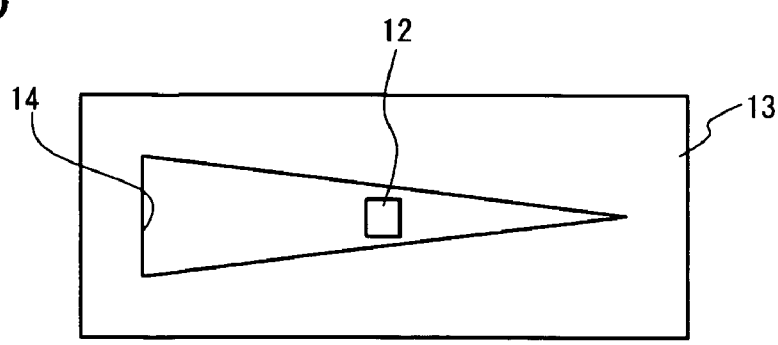

FIG. 10A through FIG. 10D illustrate a detection portion 10F adopted in an input device in accordance with a sixth embodiment. FIG. 10A illustrates a perspective view of the detection portion 10F, FIG. 10B illustrates a top view of the detection portion 10F, FIG. 10C illustrates a side view of the detection portion 10F and FIG. 10D illustrates a bottom view of the detection portion 10F. The detection portion 10F has no optical emitter but has the optical receiver 12. In the detection portion 10F, the optical receiver 12 receives an outside light such as room light or sunlight. The input device having the detection portion 10F can input an instruction, as in the case of the input device in accordance with the first embodiment. In the sixth embodiment, the optical receiver 12 may be arranged at a fixed position, as in the case of the embodiments mentioned above. And the light quantity regulator 13 may be arranged at a fixed position.

Figure 11A:
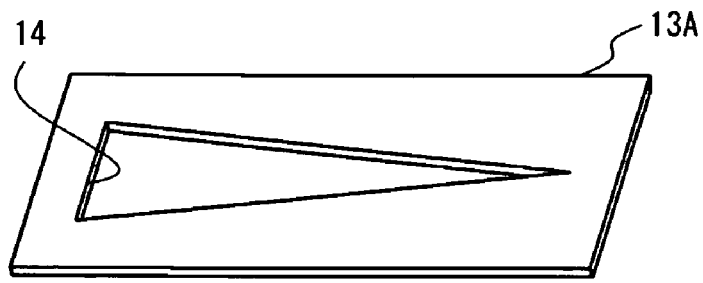
FIG. 11A through FIG. 11E illustrate specific examples which can be adopted to a light quantity regulator.
Figure 11B:
Figure 11C:
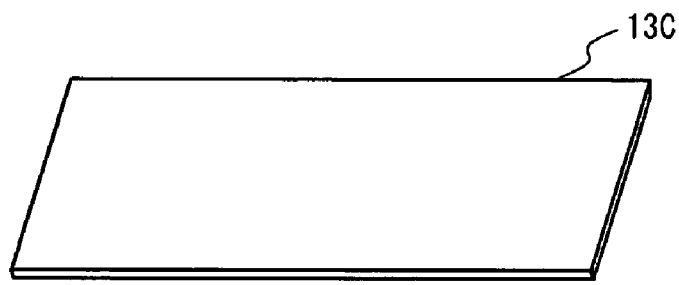
Figure 11D:
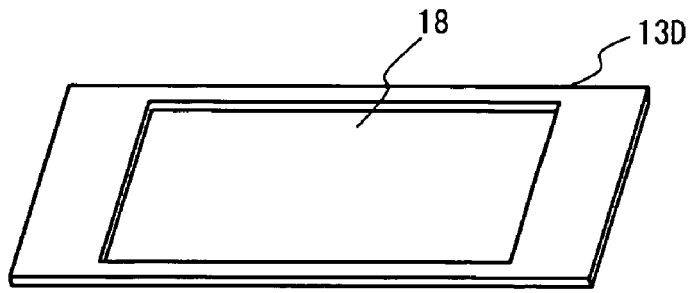
Figure 11E:
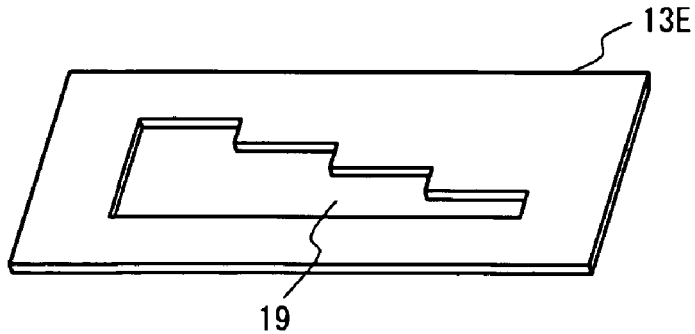

FIG. 11A through FIG. 11E illustrate specific examples which can be adopted to the light quantity regulator 13. FIG. 11A illustrates a configuration example 13A as shown in the embodiments mentioned above. That is, the configuration example 13A has the hole 14 having a triangle shape. The form of the hole where light passes is not limited to that of the configuration example 13A. The hole may be formed so that light quantity changes continuously. FIG. 11B illustrates a configuration example 13B having a triangle shape. FIG. 11C illustrates a configuration example 13C having a member in which light transmission changes continuously along a direction of relative movement of the optical emitter and the optical receiver (the X-axis and the Y-axis in the embodiment). For example, in the member, the light transmission may change from the left side to the right side of FIG. 11C. FIG. 11D illustrates a configuration example 13D having a lens member 18 engaged in an opening thereof so that a focal length changes continuously in the movement direction. The quantity of light provided to the optical receiver may change when the focal length changes. Further, FIG. 11E illustrates a configuration example 13E having a hole 19 formed stepwise. In this case, it is possible to change the light quantity stepwise, if the form is used. In addition, that the light quantity changes continuously may include that the light quantity always changes and may include that the light quantity changes stepwise. The configuration example 11E corresponds to the latter.

Seventh Embodiment

Figure 12A:
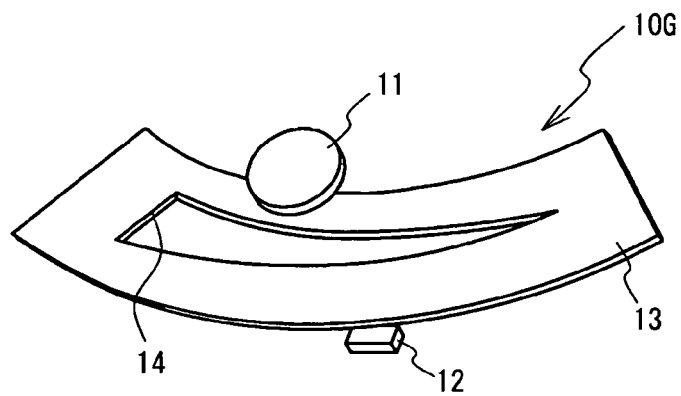
FIG. 12A through FIG. 12D illustrate a detection portion adopted in an input device in accordance with a seventh embodiment.
Figure 12B:
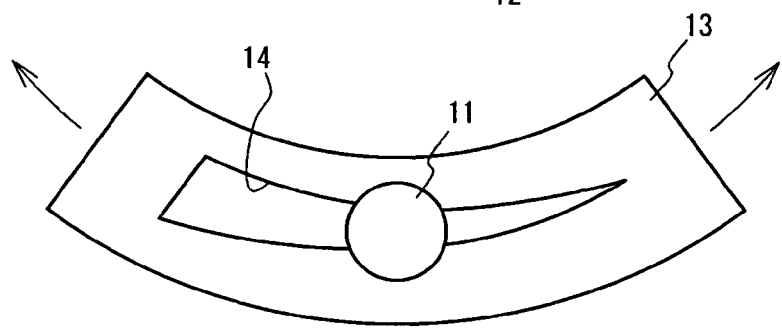
Figure 12C:
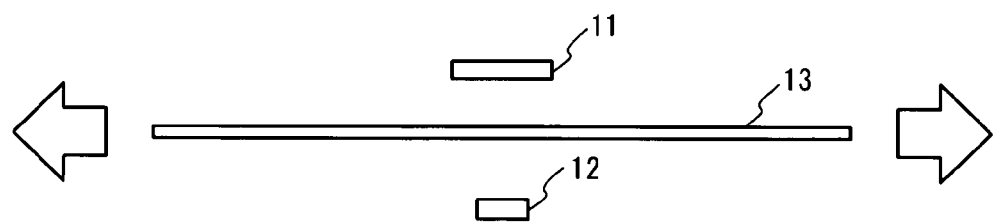
Figure 12D:
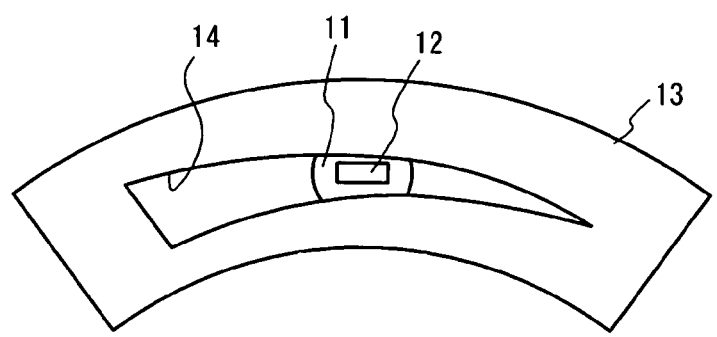

Further description will be given of another input device inputting an instruction based on the change of the light quantity. In the input device in accordance with a seventh embodiment, the optical emitter and the optical receiver moves relative to the light quantity regulator on a curved line. FIG. 12A through FIG. 12D illustrate a detection portion 10G adopted in an input device 1 in accordance with the seventh embodiment. FIG. 12A illustrates a perspective view of the detection portion 10G, FIG. 12B illustrates a top view of the detection portion 10G, FIG. 12C illustrates a side view of the detection portion 10G and FIG. 12D illustrates a bottom view of the detection portion 10G.

The optical emitter 11 and the optical receiver 12 are arranged to be at a fixed position and to face to each other at a given interval. The light quantity regulator 13 is a shading thin sheet member formed of a resin or the like as in the case of the embodiments mentioned above, but has a circular shape. The hole (slit) 14 has a deformed triangle shape along the outer shape of the light quantity regulator 13. In the input device 1 in accordance with the seventh embodiment, the optical emitter 11 and the optical receiver 12 are arranged at a fixed position and the light quantity regulator 13 is movable along the circular, as shown in FIG. 12B and FIG. 12C. The detection portion 10G as shown in FIG. 12A through FIG. 12D can detect a position as in the case of the detection portions mentioned above. However, in the embodiments mentioned above, either the optical emitter 11 and the optical receiver 12 or the light quantity regulator 13 move when the movable object moves on a plane, as shown in FIG. 2 through FIG. 4. The input device 1 in accordance with the seventh embodiment has a configuration in which the movable object moves along the spherical surface. And, the light quantity regulator 13 moves along the circular.

Figure 13:
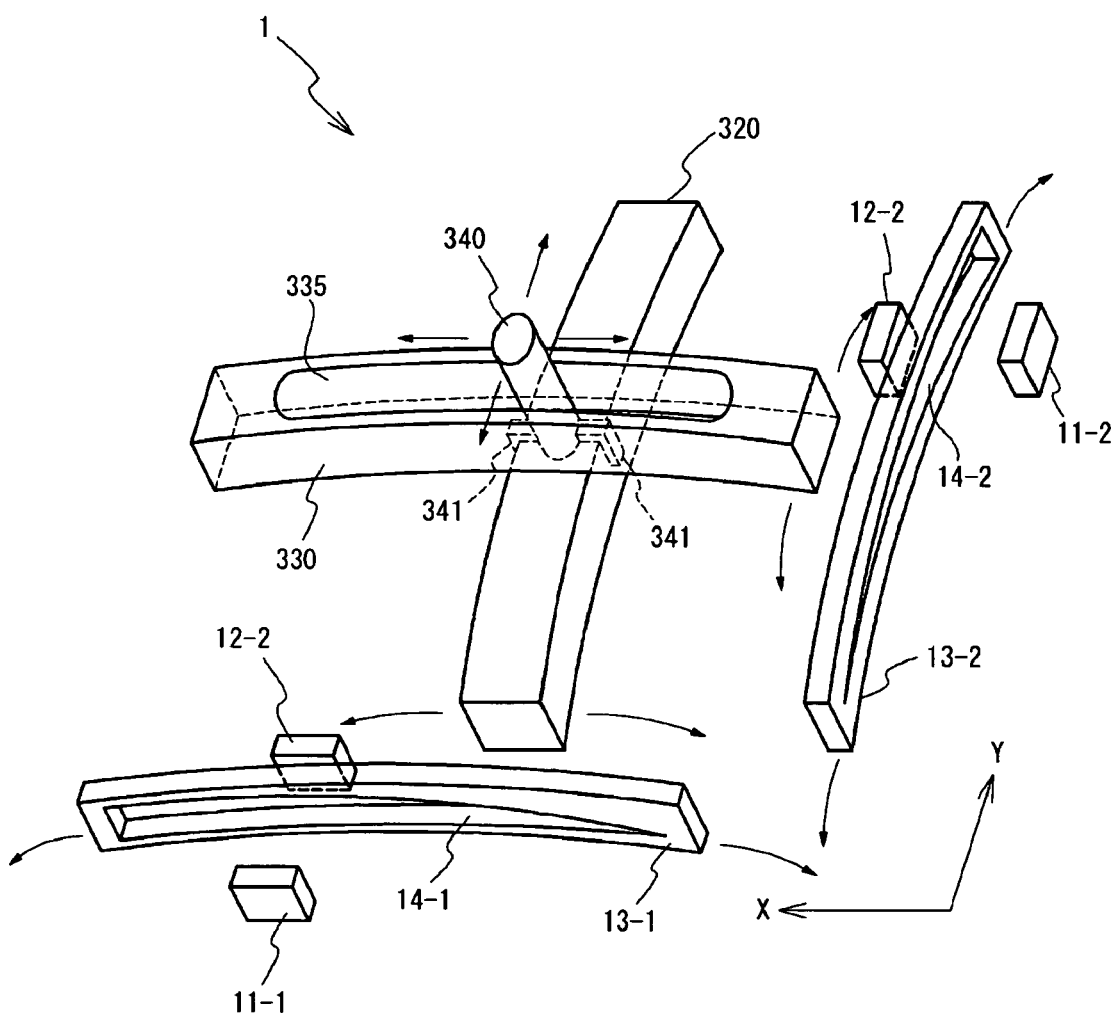
FIG. 13 illustrates a perspective schematic view of a configuration included in the input device in accordance with the seventh embodiment.

FIG. 13 illustrates a perspective schematic view of a configuration included in the input device 1 in accordance with the seventh embodiment. A movable object 340 has engaging legs 341 at the lower side thereof. The engaging legs 341 mount on a first slider 320. The first slider 320 is a square block having an arch shape whose center part is curved toward upper side. The movable object 340 slides on the first slider 320 in the Y-axis direction. The movable object 340 is at the highest position when the movable object 340 moves to the center of the first slider 320 in the Y-axis direction. And the movable object 340 is at the lowest position when the movable object 340 moves to either the both end of the first slider 320. The first slider 320 has a supporting mechanism at one end thereof, and the movable object 340 and the first light quantity regulator 13-1 move together. The first optical emitter 11-1 and the first optical receiver 12-1 are arranged to be at the opposite side of the first light quantity regulator 13-1 from each other and to face to each other at a given interval.

Further, a second slider 330 is arranged to be at right angle to the first slider 320 and to be on the first slider 320. The second slider 330 has a same outer shape as the first slider 320. An elongate hole 335 is formed at the center of the second slider 330. The movable object 340 is engaged in the elongate hole 335 and is capable of sliding in the elongate hole 335. The second light quantity regulator 13-2 is secured to one end of the second slider 330, and moves with the second slider 330. The first optical emitter 11-2 and the second optical emitter 11-2 are arranged to be at the opposite side of the second light quantity regulator 13-2 from each other and to face to each other at a given interval.

As mentioned above, the movable object 340 is arranged on the first slider 320, is capable of sliding on the first slider 320 and is engaged in the elongate hole 335 of the second slider 330. The first slider 320 and the second slider 330 have an arch shape. Therefore, when an operator moves the movable object 340, the first slider 320 and the second slider 330 move along a circular. Accordingly, the first light quantity regulator 13-1 moves along a circular in the X-axis direction and the second light quantity regulator 13-2 moves along a circular in the Y-axis direction. The first optical receiver 12-1 and the second optical receiver 12-2 arranged respectively on the two axes output detection signals based on the position of the movable object 340. In the seventh embodiment, the movable object 340 moves on a curved plane (for example, a part of a spherical surface). It is possible to get out the detection signals from the first optical receiver 12-1 and the second optical receiver 12-2, as in the cases of the embodiments mentioned above. It is thus possible to use the detection signals corresponding to the position of the movable object 340 moving on the curved plane for a signal for inputting an instruction. In addition, the input device 1 in accordance with the seventh embodiment may have the electrical configuration of the input device in accordance with the first embodiment shown in FIG. 5.

Eighth Embodiment

Figure 14A:
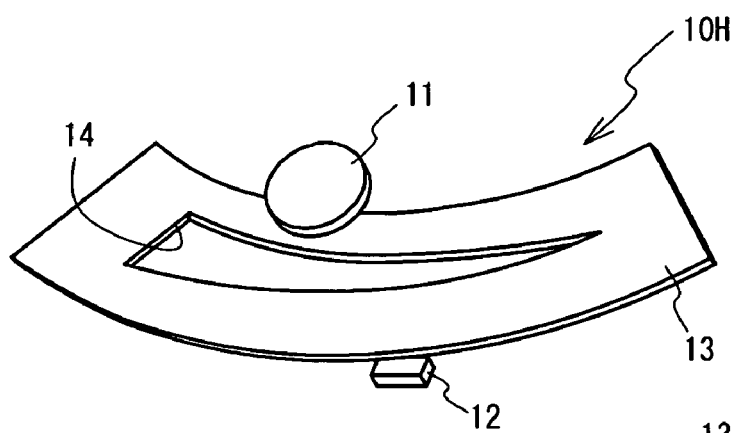
FIG. 14A through FIG. 14D illustrate a detection portion adopted in an input device in accordance with an eighth embodiment.
Figure 14B:
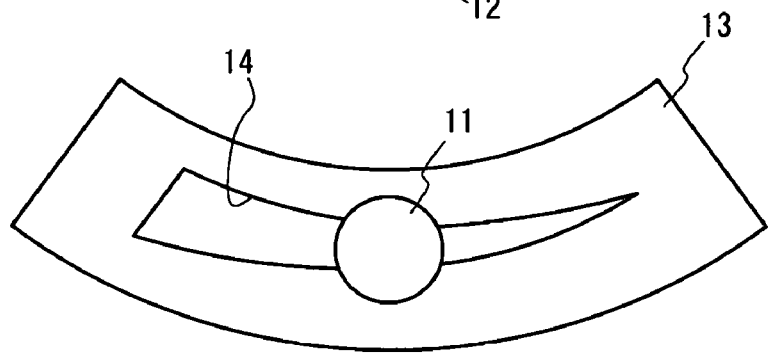
Figure 14C:
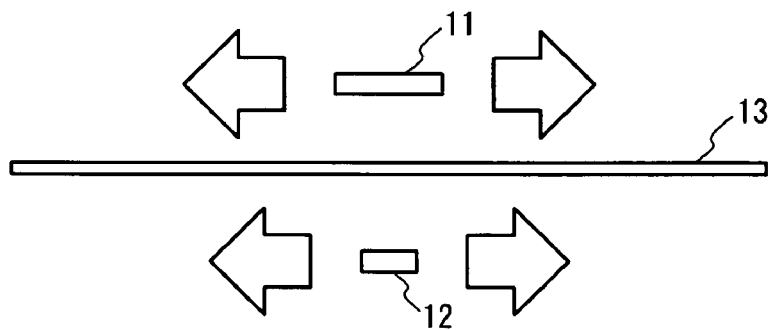
Figure 14D:
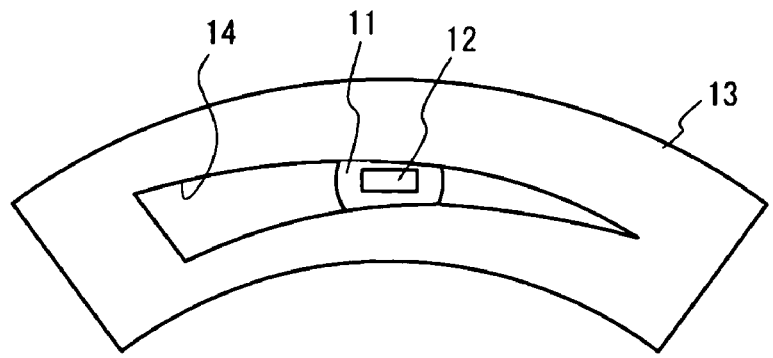

FIG. 14A through FIG. 14D illustrate a detection portion 10H adopted in an input device 1 in accordance with an eighth embodiment. FIG. 14A illustrates a perspective view of the detection portion 10H, FIG. 14B illustrates a top view of the detection portion 10H, FIG. 14C illustrates a side view of the detection portion 10H and FIG. 14D illustrates a bottom view of the detection portion 10H. The detection portion 10H has a contrasting configuration with the detection portion 10G in accordance with the seventh embodiment. The optical emitter 11 and the optical receiver 12 are movable along a circular. And the light quantity regulator 13 is arranged at a fixed position. The input device having a structure in which the optical emitter 11 and the optical receiver 12 are movable can input an instruction, as in the case of the input device in accordance with the seventh embodiment.

Ninth Embodiment

Figure 15A:
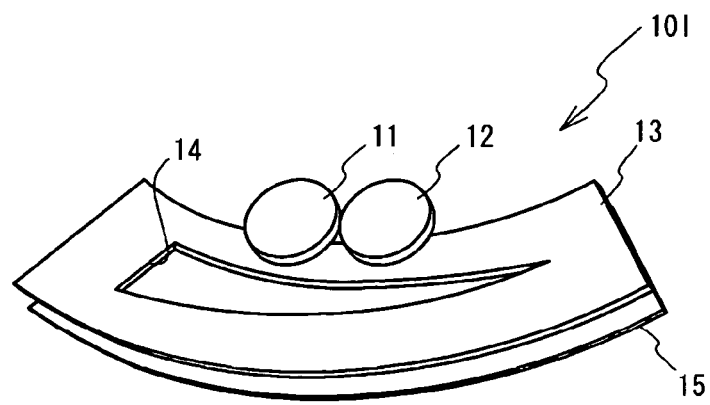
FIG. 15A through FIG. 15D illustrate a detection portion adopted in an input device in accordance with a ninth embodiment.
Figure 15B:
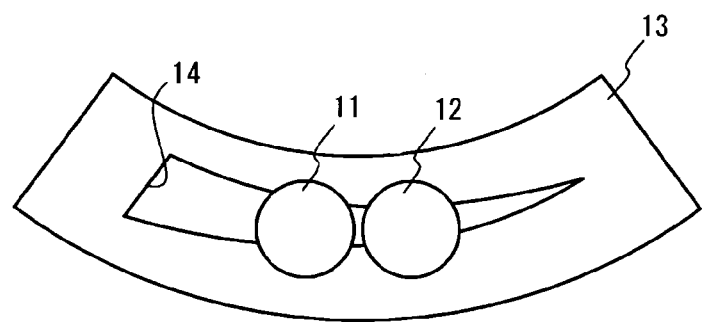
Figure 15C:
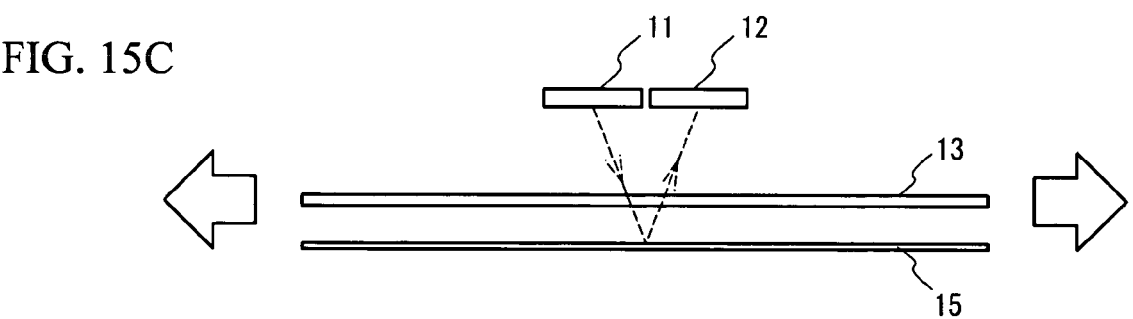
Figure 15D:
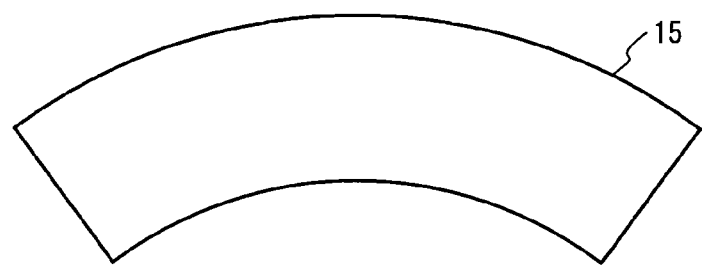

FIG. 15A through FIG. 15D illustrate a detection portion 10I adopted in an input device 1 in accordance with a ninth embodiment. FIG. 15A illustrates a perspective view of the detection portion 10I, FIG. 15B illustrates a top view of the detection portion 10I, FIG. 15C illustrates a side view of the detection portion 10I and FIG. 15D illustrates a bottom view of the detection portion 10I. In the detection portion 10I, the optical emitter 11 and the optical receiver 12 are arranged at a same side, unlike in the case of the detection portion 10G in accordance with the seventh embodiment. The optical reflector 15 is arranged at the back face side of the light quantity regulator 13 (opposite side from the optical emitter 11 and the optical receiver 12). The optical reflector 15 substantially has a same circular shape as the light quantity regulator 13. The ninth embodiment corresponds to the third embodiment (FIG. 7). The input device having the detection portion 10I can input an instruction as in the case of the input device in accordance with the seventh embodiment. In addition, it is possible to reduce the thickness of the detection portion 10I because the optical emitter 11 and the optical receiver 12 are arranged at a same side.

Tenth Embodiment

Figure 16A:
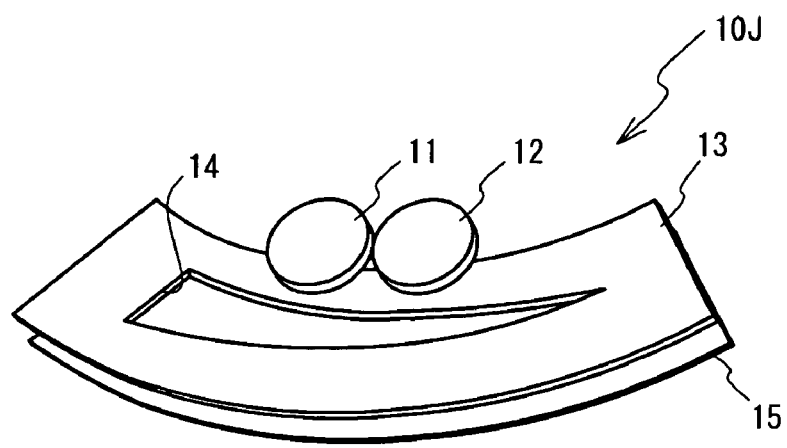
FIG. 16A through FIG. 16D illustrate a detection portion adopted in an input device in accordance with a tenth embodiment.
Figure 16B:
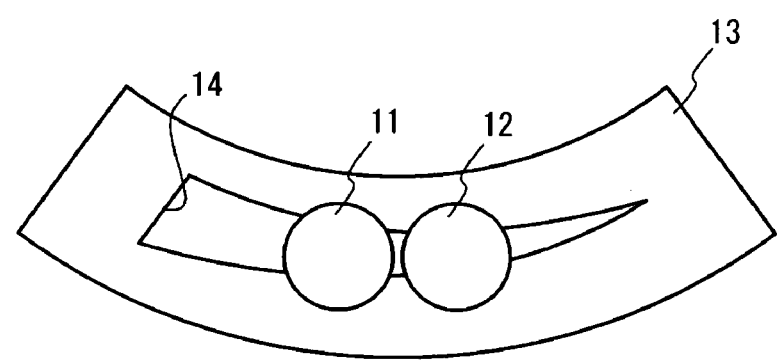
Figure 16C:
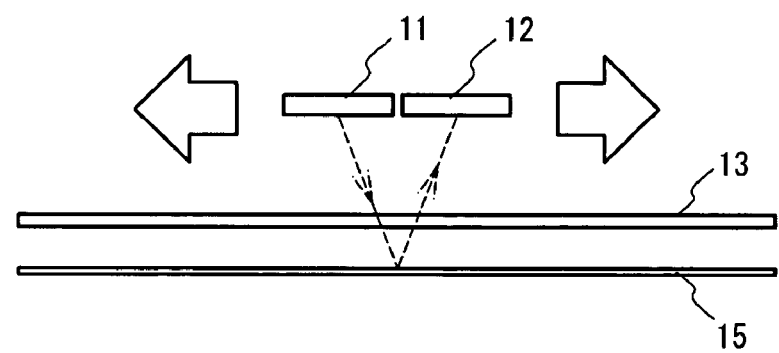
Figure 16D:
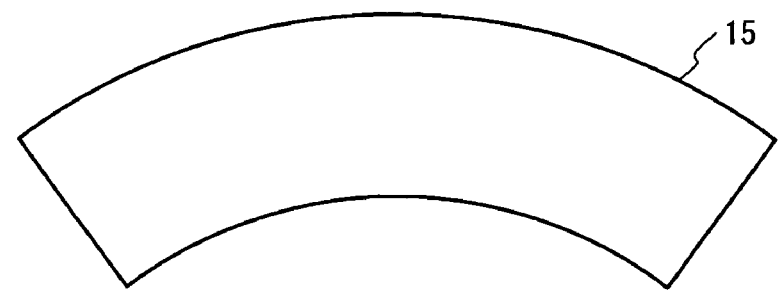

FIG. 16A through FIG. 16D illustrate a detection portion 10J adopted in an input device 1 in accordance with a tenth embodiment. FIG. 16A illustrates a perspective view of the detection portion 10J, FIG. 16B illustrates a top view of the detection portion 10J, FIG. 16C illustrates a side view of the detection portion 10J and FIG. 16D illustrates a bottom view of the detection portion 10J. The detection portion 10J has a contrasting configuration with the detection portion 10H in accordance with the ninth embodiment. The optical emitter 11 and the optical receiver 12 are movable along a circular. And the light quantity regulator 13 and the optical reflector 15 are arranged at a fixed position. The input device having the detection portion 10J in which the optical emitter 11 and the optical receiver 12 are movable can input an instruction, as in the case of the input device in accordance with the seventh embodiment.

Eleventh Embodiment

The input devices 1 in accordance with the embodiments mentioned above have a detection portion that detects a position of a movable object based on a change of quantity of light received at an optical receiver. However, a method of detecting the position of the movable object is not limited to the method using the change of the light quantity. A detection portion that detects the position of the movable object based on a change of magnetic flux may be adopted to the input devices 1 mentioned above. Hereinafter, a detection portion detecting the position of the movable object based on the change of magnetic flux will be shown. In the configuration detecting a change of magnetic flux, a magnetic flux generator corresponds to the optical emitter and a magnetic flux detector corresponds to the optical receiver. And a magnetic flux regulator that changes an amount of leaked magnetic flux corresponds to the light quantity regulator that controls light quantity passing through the light quantity regulator. Other mechanical configurations of the input device using a change of magnetic flux are same as those of the input device using a change of light quantity. A description will be given of a different configuration. The parts of a detection portion 10K shown in FIG. 17A through FIG. 17D are different from those of the detection portion 10A, because the detection portion 10K uses a change of magnetic flux. A configuration of the detection portion 10K in which the movable object 140 moves is as same as that of the detection portion 10A.

Figure 17A:
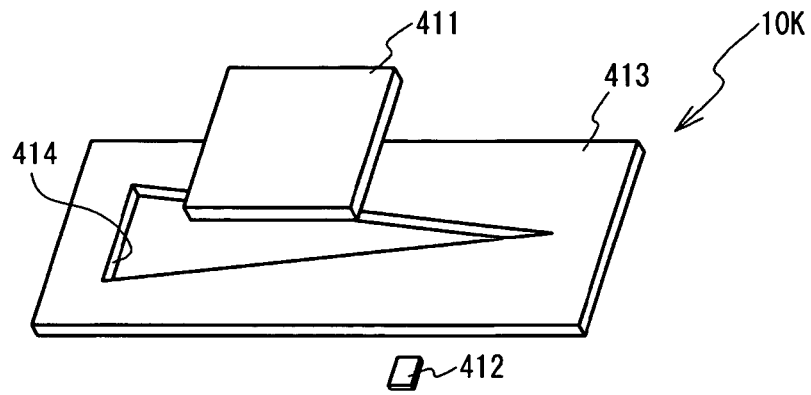
FIG. 17A through FIG. 17D illustrate a detection portion adopted in an input device in accordance with an eleventh embodiment.
Figure 17B:
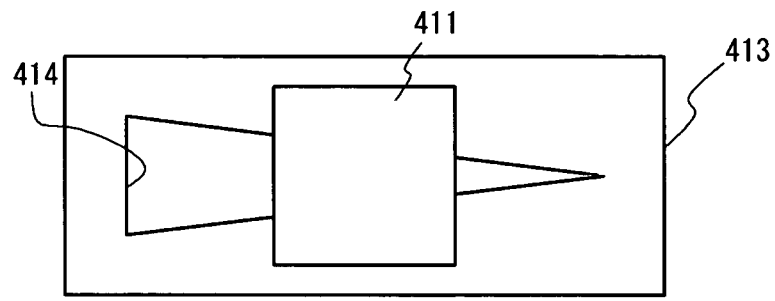
Figure 17C:
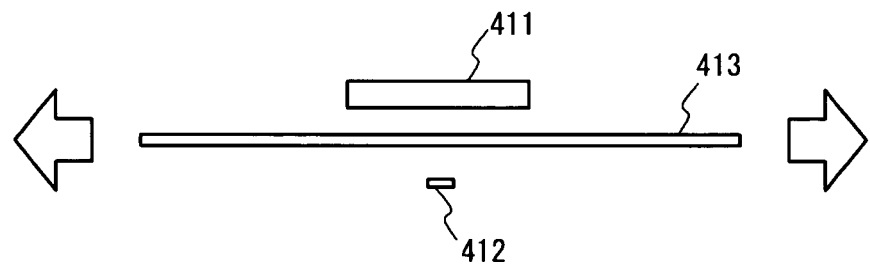
Figure 17D:
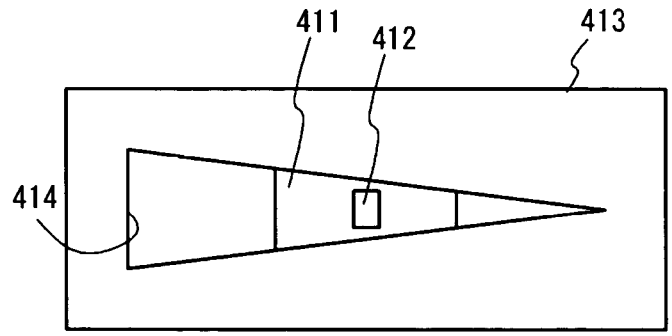

FIG. 17A through FIG. 17D illustrate the detection portion 10K adopted in an input device in accordance with an eleventh embodiment. FIG. 17A illustrates a perspective view of the detection portion 10K, FIG. 17B illustrates a top view of the detection portion 10K, FIG. 17C illustrates a side view of the detection portion 10K, and FIG. 17D illustrates a bottom view of the detection portion 10K. The detection portion 10K has a magnetic flux generator 411 that generates a magnetic flux and has a magnetic flux detector 412 that outputs a signal based on a change of a magnetic flux caused by the magnetic flux generator 411. A ferromagnetic member such as a permanent magnet, an electric magnet generating a magnetic flux electrically or the like may be used as the magnetic flux generator 411. A magnetic flux detection element such as a hall element or a magnetoresistive effect element may be used as the magnetic flux detector 412.

There is provided a magnetic flux regulator 413 serving as a magnetic flux barrier between the magnetic flux generator 411 and the magnetic flux detector 412. The magnetic flux regulator 413 is a thin sheet member formed of a nonmagnetic member or the like. A hole (a slit) 414 is formed at the center of the magnetic flux regulator 413. A part of a magnetic flux generated by the magnetic flux generator 411 passes (is leaked) through the hole 414, and the magnetic flux detector 412 detects the leaked magnetic flux. In addition, a pair of the magnetic flux generator 411 and the magnetic flux detector 412 moves relative to the magnetic flux regulator 413.

The hole 414 formed in the magnetic flux regulator 413 is formed so that a leaked magnetic flux changes continuously (linearly) with the movement of the magnetic flux regulator 413. In the embodiment shown in FIG. 17A through FIG. 17D, the hole 414 is formed so that the magnetic flux increases when the magnetic flux regulator 413 moves to right side and decreases when the magnetic flux regulator 413 moves to opposite side. Although the hole 414 has a triangle shape in the embodiment, the shape of the hole 414 is not limited. The hole 414 may be formed so that the magnetic flux changes with the movement of the leaked magnetic flux regulator 413.

The input device having the detection portion 10K can detect the position of the movable object and can input an instruction by using the position information.

Twelfth Embodiment

Figure 18A:
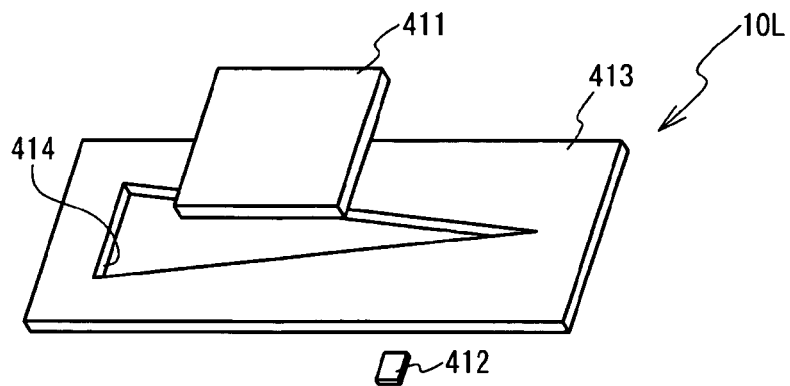
FIG. 18A through FIG. 18D illustrate a detection portion adopted in an input device in accordance with a twelfth embodiment.
Figure 18B:
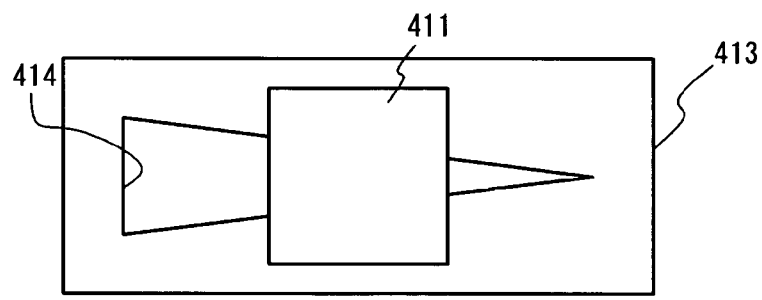
Figure 18C:
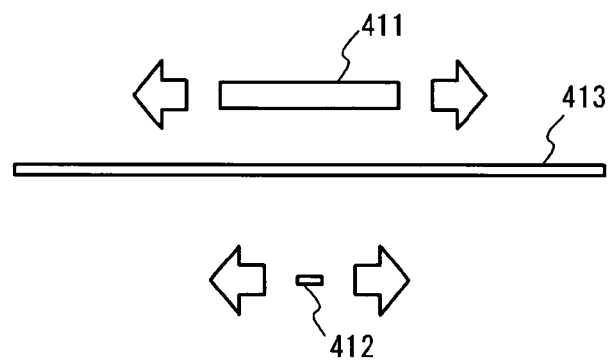
Figure 18D:
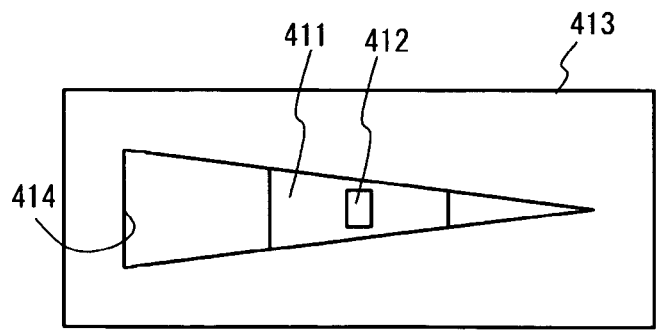

FIG. 18A through FIG. 18D illustrate a detection portion 10L adopted in an input device 1 in accordance with a twelfth embodiment. FIG. 18A illustrates a perspective view of the detection portion 10L, FIG. 18B illustrates a top view of the detection portion 10L, FIG. 18C illustrates a side view of the detection portion 10L and FIG. 18D illustrates a bottom view of the detection portion 10L. The detection portion 10L has a contrasting configuration with the detection portion 10K in accordance with the eleventh embodiment. The magnetic flux regulator 413 is arranged at a fixed position. The magnetic flux generator 411 and the magnetic flux detector 412 are movable. The driving mechanism of the detection portion 10L is same as that of the detection portion 10B in accordance with the second embodiment.

Thirteenth Embodiment

Figure 19A:
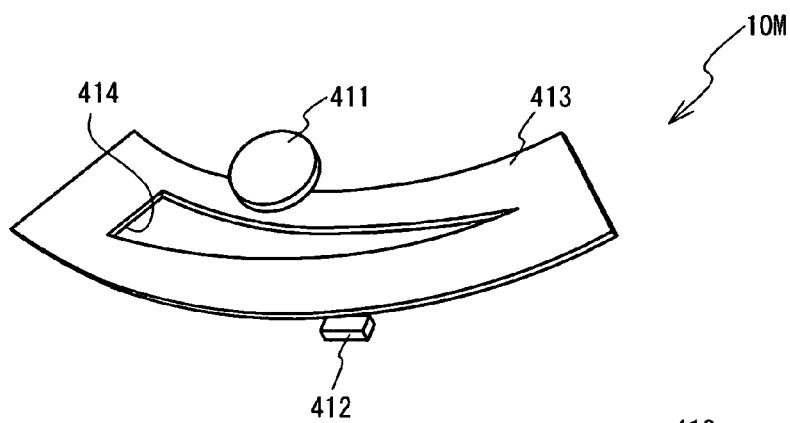
FIG. 19A through FIG. 19D illustrate a detection portion adopted in an input device in accordance with a thirteenth embodiment.
Figure 19B:
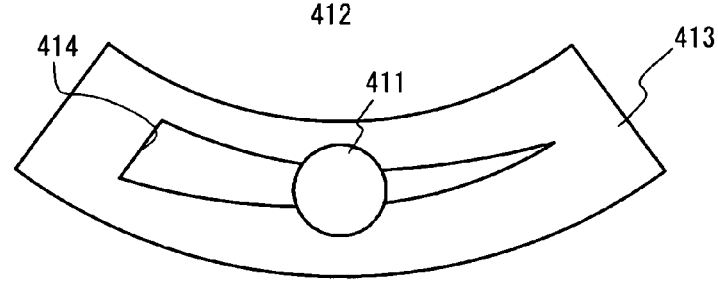
Figure 19C:
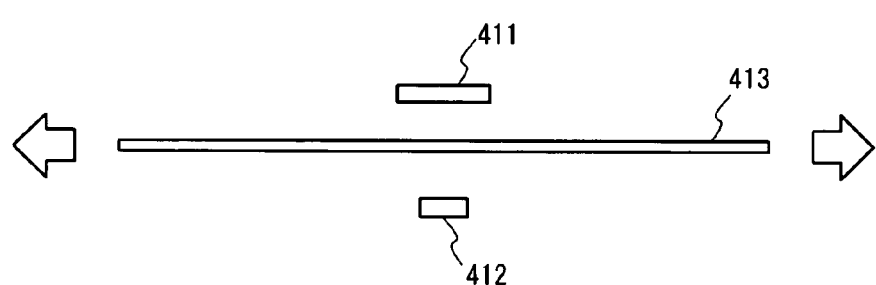
Figure 19D:
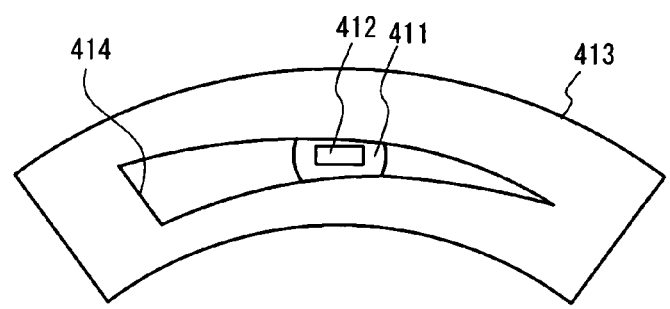

FIG. 19A through FIG. 19D illustrate a detection portion 10M adopted in an input device in accordance with a thirteenth embodiment. FIG. 19A illustrates a perspective view of the detection portion 10M, FIG. 19B illustrates a top view of the detection portion 10M, FIG. 19C illustrates a side view of the detection portion 10M and FIG. 19D illustrates a bottom view of the detection portion 10M. The detection portion 10M is different from the detection portion 10K in accordance with the eleventh embodiment in that the magnetic flux regulator 413 has a circular shape. The driving mechanism of the detection portion 10M is same as in the case of the seventh embodiment shown in FIG. 13.

Fourteenth Embodiment

Figure 20A:
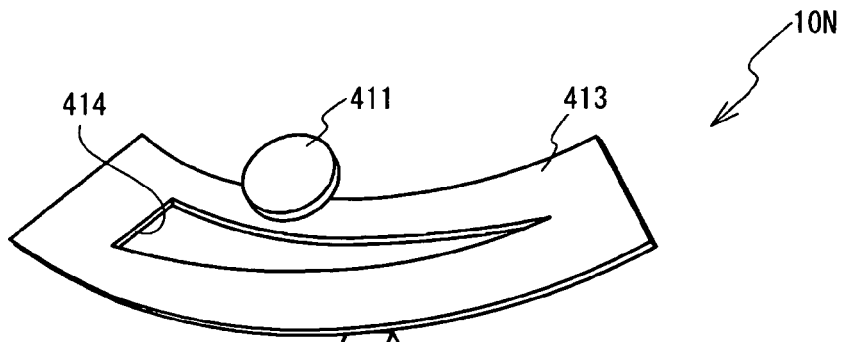
FIG. 20A through FIG. 20D illustrate a detection portion adopted in an input device in accordance with a fourteenth embodiment.
Figure 20B:
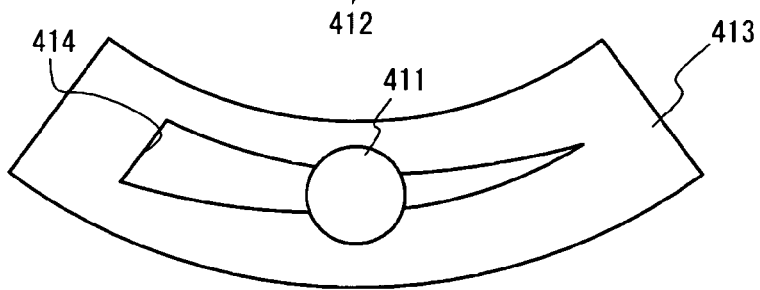
Figure 20C:
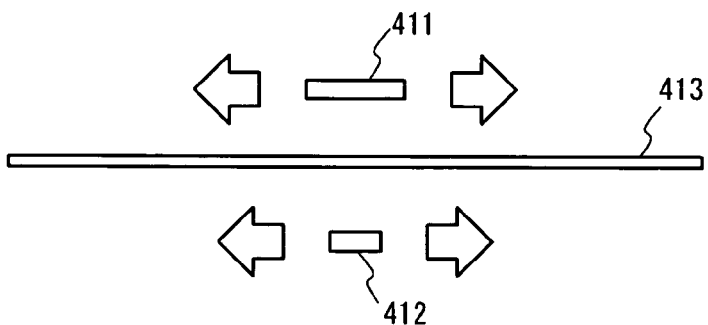
Figure 20D:
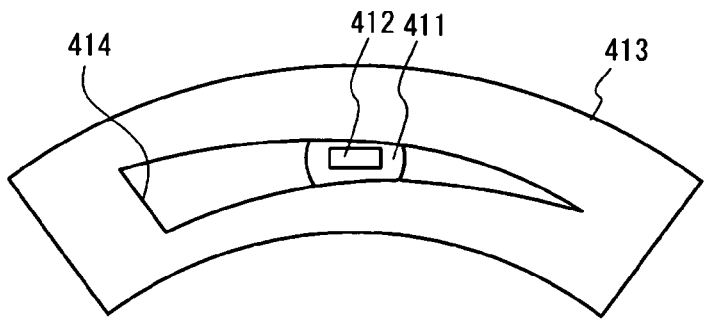

FIG. 20A through FIG. 20D illustrate a detection portion 10N adopted in an input device 1 in accordance with a fourteenth embodiment. FIG. 20A illustrates a perspective view of the detection portion 10N, FIG. 20B illustrates a top view of the detection portion 10N, FIG. 20C illustrates a side view of the detection portion 10N and FIG. 20D illustrates a bottom view of the detection portion 10N. The detection portion 10N has a contrasting configuration with the detection portion 10M in accordance with the thirteenth embodiment. The magnetic flux regulator 413 is arranged at a fixed position. The magnetic flux generator 411 and the magnetic flux detector 412 are movable.

As mentioned above, in the input device in accordance with the embodiments, the first detection portion and the second detection portion respectively arranged on two axes crossed at right angle to each other detect the position of the movable object based on a change of light or magnetic flux. The position information is used for inputting an instruction. The load of the input device is smaller than that of a device changing an electrical resistance such as a volume switch. In the embodiments mentioned above, one detection portion detecting the position of the movable object by using a change of light quantity and the other are paired, and one detection portion detecting the position of the movable object by using a change of magnetic flux and the other are paired. However, the detection portion detecting the position of the movable object by using a change of light quantity and the detection portion detecting the position of the movable object by using a change of magnetic flux may be paired.

While the above description constitutes the preferred embodiments of the present invention, it will be appreciated that the invention is susceptible of modification, variation and change without departing from the proper scope and fair meaning of the accompanying claims.

The present invention is based on Japanese Patent Application No. 2005-018994 filed on Jan. 26, 2005, the entire disclosure of which is hereby incorporated by reference.

What is claimed is:

1. An input device that detects a position of a movable object moving on a given plane and inputs an instruction, comprising:
 a first detection portion that detects the position of the movable object in a first direction; and
 a second detection portion that detects the position of the movable object in a second direction crossed at right angle to the first direction;
 wherein:
 the first detection portion and the second detection portion detect movement amounts of the movable object in the first direction and in the second direction, based on a change of either a light quantity or a magnetic flux,
 the first detection portion has a first regulator, a first emitter and a first receiver,
 the first regulator moves with the movable object in the first direction and changes a quantity of a light passing through the first regulator or an amount of leaked magnetic flux, the first regulator being arranged between the first emitter and the first receiver, the second detection portion has a second regulator, a second emitter and a second receiver, the second regulator moves with the movable object in the second direction and changes a quantity of a light passing through the second regulator or an amount of leaked magnetic flux, and the second regulator being arranged between the second emitter and the second receiver.

2. The input device as claimed in claim 1, wherein:

the first detection portion has a first optical emitter, a first optical receiver and a first light quantity regulator, the first optical emitter and the first optical receiver moving with the movable object in the first direction, the first light quantity regulator being arranged in parallel with the first direction at a fixed position between the first optical emitter and the first optical receiver, and changing quantity of a light passing through the first light quantity regulator; and the second detection portion has a second optical emitter, a second optical receiver and a second light quantity regulator, the second optical emitter and the second optical receiver moving with the movable object in the second direction, the second light quantity regulator being arranged in parallel with the second direction at a fixed position between the second optical emitter and the second optical receiver, and changing quantity of a light passing through the second light quantity regulator.

3. The input device as claimed in claim 1, wherein:

the first regulator has a first light quantity regulator, the first emitter has a first optical emitter, the first receiver has a first optical receiver, the first light quantity regulator moves with the movable object in the first direction and changes a quantity of a light passing through the first light quantity regulator, the first optical emitter and the first optical receiver are arranged at a fixed position on an opposite side of the first light quantity regulator from each other, the second regulator has a second light quantity regulator, the second emitter has a second optical emitter, the second receiver has a second optical receiver, the second light quantity regulator moves with the movable object in the second direction and changes a quantity of a light passing through the second light quantity regulator, and the second optical emitter and the second optical receiver are arranged at a fixed position on an opposite side of the second light quantity regulator from each other.

4. The input device as claimed in claim 3, wherein:

the first light quantity regulator and the second light quantity regulator have a hole respectively; and the holes are formed so that light quantity received at the first optical receiver and the second optical receiver changes continuously based on a position of the movable object.

5. The input device as claimed in claim 4, wherein the form of the holes changes continuously or stepwise.

6. The input device as claimed in claim 3, wherein the first light quantity regulator and the second light quantity regulator are formed of a member that continuously changes a transmission of a passing light based on a position of the movable object.

7. The input device as claimed in claim 3, wherein the first light quantity regulator and the second light quantity regulator are formed of a member that continuously changes a focal length based on a position of the movable object.

8. The input device as claimed in claim 1, wherein:

the first detection portion has a first optical emitter, a first optical receiver, a first light quantity regulator and a first optical reflector, the first optical emitter and the first optical receiver being arranged on a same plane and moving with the movable object in the first direction, the first light quantity regulator facing to the first optical emitter and the first optical receiver, being arranged in parallel with the first direction at a fixed position, and changing quantity of a light passing through the first light quantity regulator, the first optical reflector being arranged on a back face side of the first light quantity regulator; and the second detection portion has a second optical emitter, a second optical receiver, a second light quantity regulator and a second optical reflector, the second optical emitter and the second optical receiver being arranged on a same plane and moving with the movable object in the second direction, the second light quantity regulator facing to the second optical emitter and the second optical receiver, being arranged in parallel with the second direction at a fixed position, and changing quantity of a light passing through the second light quantity regulator, the second optical reflector being arranged on a back face side of the second light quantity regulator.

9. The input device as claimed in claim 1, wherein:

the first detection portion has a first light quantity regulator, a first optical reflector, a first optical emitter and a first optical receiver, the first light quantity regulator moving with the movable object in the first direction and changing quantity of a light passing through the first light quantity regulator, the first optical reflector being arranged on a back face side of the first light quantity regulator, the first optical emitter and the first optical receiver facing to the first light quantity regulator and being arranged at a fixed position on a same plane; and the second detection portion has a second light quantity regulator, a second optical reflector, a second optical emitter and a second optical receiver, the second light quantity regulator moving with the movable object in the second direction and changing quantity of a light passing through the second light quantity regulator, the second optical reflector being arranged on a back surface side of the second light quantity regulator, the second optical emitter and the second optical receiver facing to the second light quantity regulator and being arranged at a fixed position on a same plane.

10. The input device as claimed in claim 1, wherein:

the first detection portion has a first optical emitter, a first optical receiver, a first light quantity regulator and a first light introducing member, the first optical emitter and the first optical receiver moving with the movable object in the first direction and being arranged on a same plane, the first light quantity regulator facing to the first optical emitter and the first optical receiver, being arranged in parallel with the first direction at a fixed position, and changing quantity of a light passing through the first light quantity regulator, the first light introducing member being arranged on a back face side of the first light quantity regulator, receiving a light from the first optical emitter, and emitting the light toward the first optical receiver; and the second detection portion has a second optical emitter, a second optical receiver, a second light quantity regulator and a second light introducing member, the second optical emitter and the second optical receiver moving with the movable object in the second direction and being arranged on a same plane, the second light quantity regulator facing to the second optical emitter and the second optical receiver, being arranged in parallel with the second direction at a fixed position, and changing quantity of a light passing through the second light quantity regulator, the second light introducing member being arranged on a back face side of the second light quantity regulator, receiving a light from the second optical emitter, and emitting the light toward the second optical receiver.

11. The input device as claimed in claim 1, wherein:

the first detection portion has a first light quantity regulator, a first light introducing member, a first optical emitter and a first optical receiver, the first light quantity regulator moving with the movable object in the first direction and changing quantity of a light passing through the first light quantity regulator, the first light introducing member being arranged on a back face side of the first light quantity regulator, receiving a light from the first optical emitter, and emitting the light toward the first optical receiver, the first optical emitter and the first optical receiver facing to the first light quantity regulator and being arranged at a fixed position on a same plane; and the second detection portion has a second light quantity regulator, a second light introducing member, a second optical emitter and a second optical receiver, the second light quantity regulator moving with the movable object in the second direction and changing quantity of a light passing through the second light quantity regulator, the second light introducing member being arranged on a back face side of the second light quantity regulator, receiving a light from the second optical emitter, and emitting the light toward the second optical receiver, the second optical emitter and the second optical receiver facing to the second light quantity regulator and being arranged at a fixed position on a same plane.

12. The input device as claimed in claim 1, wherein:

the first detection portion has a first optical receiver arranged at a fixed position and has a first light quantity regulator, the first light quantity regulator facing to the first optical receiver, moving with the movable object in the first direction and changing quantity of an outside light provided to the first optical receiver; and the second detection portion has a second optical receiver arranged at a fixed position and has a second light quantity regulator, the second light quantity regulator facing to the second optical receiver, moving with the movable object in the second direction and changing quantity of an outside light provided to the second optical receiver.

13. The input device as claimed in claim 1, wherein:

the first detection portion has a first optical receiver and a first light quantity regulator, the first optical receiver moving with the movable object in the first direction, the first light quantity regulator facing to the first optical receiver, being arranged in parallel with the first direction at a fixed position and changing quantity of an outside light provided to the first optical receiver; and the second detection portion has a second optical receiver and a second light quantity regulator, the second optical receiver moving with the movable object in the second direction, the second light quantity regulator facing to the second optical receiver, being in parallel with the second direction arranged at a fixed position and changing quantity of an outside light provided to the second optical receiver.

14. The input device as claimed in claim 1, wherein:

the first detection portion has a first magnetic flux generator, a first magnetic flux detector and a first magnetic flux regulator, the first magnetic flux generator and the first magnetic flux detector moving with the movable object in the first direction, the first magnetic flux regulator being arranged in parallel with the first direction at a fixed position between the first magnetic flux generator and the first magnetic flux detector and changing an amount of leaked magnetic flux; and the second detection portion has a second magnetic flux generator, a second magnetic flux detector and a second magnetic flux regulator, the second magnetic flux generator and the second magnetic flux detector moving with the movable object in the second direction, the second magnetic flux regulator being arranged in parallel with the second direction at a fixed position between the second magnetic flux generator and the second magnetic flux detector and changing an amount of leaked magnetic flux.

15. The input device as claimed in claim 14, wherein:

the first magnetic flux regulator and the second magnetic flux regulator have a hole where a part of the magnetic flux from the first magnetic flux generator and the second magnetic flux generator passes; and forms of the holes changes continuously or stepwise.

16. The input device as claimed in claim 14, wherein the first magnetic flux detector and the second magnetic flux detector are hall elements.

17. The input device as claimed in claim 1, wherein:

the first detection portion has a first magnetic flux regulator, a first magnetic flux generator and a first magnetic flux detector, the first magnetic flux regulator moving with the movable object in the first direction and changing an amount of leaked magnetic flux, the first magnetic flux generator and the first magnetic flux detector being arranged at a fixed position on an opposite side of the first magnetic flux regulator from each other; and the second detection portion has a second magnetic flux regulator, a second magnetic flux generator and a second magnetic flux detector, the second magnetic flux regulator moving with the movable object in the second direction and changing an amount of leaked magnetic flux, the second magnetic flux generator and the second magnetic flux detector being arranged at a fixed position on an opposite side of the second magnetic flux regulator from each other.

18. The input device as claimed in claim 1, wherein the given plane where the movable object moves is a part of a flat plane or a curved plane.

* * * * *